(12) United States Patent
Cho et al.

(10) Patent No.: US 12,267,377 B2
(45) Date of Patent: Apr. 1, 2025

(54) ELECTRONIC DEVICE AND METHOD FOR TRANSMITTING AND RECEIVING VIDEO THEREOF

(71) Applicant: Samsung Electronics Co., Ltd., Suwon-si (KR)

(72) Inventors: Hyonmyong Cho, Suwon-si (KR);
Hoonjae Lee, Suwon-si (KR);
Jeongwun Jee, Suwon-si (KR);
Yongtae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 17/573,957

(22) Filed: Jan. 12, 2022

(65) Prior Publication Data
US 2022/0224742 A1 Jul. 14, 2022

Related U.S. Application Data

(63) Continuation of application No. PCT/KR2022/000175, filed on Jan. 5, 2022.

(30) Foreign Application Priority Data

Jan. 13, 2021 (KR) .......................... 10-2021-0004863

(51) Int. Cl.
*H04L 65/75* (2022.01)
*G02B 27/01* (2006.01)
(Continued)

(52) U.S. Cl.
CPC .......... *H04L 65/75* (2022.05); *G02B 27/0172* (2013.01); *G06T 11/00* (2013.01);
(Continued)

(58) Field of Classification Search
None
See application file for complete search history.

(56) References Cited

U.S. PATENT DOCUMENTS 9,077,667 B2 * 7/2015 Sridhar .................. H04L 65/65
9,332,049 B1 * 5/2016 Herrero ................. H04L 65/762
(Continued)

FOREIGN PATENT DOCUMENTS

| CN | 111025651 | * | 4/2020 | ............. G02B 27/01 |
| CN | 113141352 | * | 7/2021 | ............. H04L 29/06 |

(Continued)

OTHER PUBLICATIONS

International Search Report dated Apr. 14, 2022, issued in an International Application No. PCT/KR2022/000175.
(Continued)

*Primary Examiner* — Andrew G Yang
(74) *Attorney, Agent, or Firm* — Jefferson IP Law, LLP

(57) ABSTRACT

An electronic device is provided. The electronic device is configured to establish a short-range connection with an external device including a second camera, establish a connection for image transmission/reception with a counterpart device, determine a format of image data to be transmitted to the counterpart device, select one of the first camera of the electronic device and the second camera of the external device to acquire an image to be transmitted to the counterpart device, when the first camera is selected, packetize first image data acquired from the first camera according to the format, so as to transmit the packetized first image data to the counterpart device through the communication module, and when the second camera is selected, receive second image data from the external device, and packetize (Continued)

the second image data according to the determined format, so as to transmit the packetized second image data to the counterpart device.

20 Claims, 19 Drawing Sheets

(51) Int. Cl.
   *G06T 11/00*   (2006.01)
   *H04L 65/65*   (2022.01)
   *H04W 4/80*   (2018.01)
(52) U.S. Cl.
   CPC ............... *H04L 65/65* (2022.05); *H04W 4/80* (2018.02); *G02B 2027/0178* (2013.01)

(56) References Cited

U.S. PATENT DOCUMENTS

| | | | |
|---|---|---|---|
| 9,769,434 B1* | 9/2017 | Smallwood | G06F 16/00 |
| 2012/0030314 A1 | 2/2012 | Kim et al. | |
| 2014/0036025 A1 | 2/2014 | Bengtsson et al. | |
| 2014/0085418 A1 | 3/2014 | Takahashi et al. | |
| 2015/0163811 A1* | 6/2015 | Konstantinou | H04W 76/16 370/329 |
| 2015/0312598 A1* | 10/2015 | Itakura | H04N 21/236 725/117 |
| 2016/0127728 A1 | 5/2016 | Tanizawa et al. | |
| 2016/0134929 A1* | 5/2016 | Robii | H04N 21/4508 725/81 |
| 2016/0328627 A1* | 11/2016 | Fujii | H04M 11/00 |
| 2016/0350595 A1* | 12/2016 | Solomin | G06V 20/20 |
| 2017/0200356 A1 | 7/2017 | Kim | |
| 2017/0237986 A1* | 8/2017 | Choi | H04W 4/80 348/14.02 |
| 2018/0014063 A1* | 1/2018 | Liu | H04W 4/80 |
| 2018/0041924 A1 | 2/2018 | Hori et al. | |
| 2018/0115747 A1* | 4/2018 | Bayley | H04W 76/14 |
| 2018/0183849 A1 | 6/2018 | Shin et al. | |
| 2019/0104215 A1 | 4/2019 | Morisaki | |
| 2019/0149731 A1* | 5/2019 | Blazer | G06F 3/011 348/39 |
| 2019/0208114 A1* | 7/2019 | Ginat | H04N 21/234345 |
| 2019/0306555 A1* | 10/2019 | Oh | G06F 9/3004 |
| 2019/0335287 A1 | 10/2019 | Jung et al. | |
| 2020/0053417 A1 | 2/2020 | Choi et al. | |
| 2020/0342521 A1* | 10/2020 | Tang | G06Q 30/0643 |
| 2021/0044645 A1* | 2/2021 | Jayaweera | H04L 65/403 |
| 2021/0097315 A1* | 4/2021 | Carruthers | G08B 13/19645 |
| 2021/0136137 A1* | 5/2021 | Munoz | H04L 67/563 |
| 2021/0183343 A1* | 6/2021 | Beith | G09G 5/38 |
| 2021/0397181 A1 | 12/2021 | Hwang et al. | |
| 2022/0078396 A1* | 3/2022 | Gül | H04L 65/65 |

FOREIGN PATENT DOCUMENTS

| | | |
|---|---|---|
| JP | 2010-130654 A | 6/2010 |
| JP | 2016-092837 A | 5/2016 |
| JP | 2017-175323 A | 9/2017 |
| JP | 6716355 B2 | 7/2020 |
| KR | 10-2010-0070602 A | 6/2010 |
| KR | 10-2012-0008400 A | 1/2012 |
| KR | 10-1460112 B1 | 11/2014 |
| KR | 10-1712102 B1 | 3/2017 |
| KR | 10-2017-0119306 A | 10/2017 |
| KR | 10-2018-0039341 A | 4/2018 |
| KR | 10-2018-0073228 A | 7/2018 |
| KR | 10-2136889 B1 | 7/2020 |
| WO | 2012-157443 A1 | 11/2012 |
| WO | 2016-185649 A1 | 11/2016 |

OTHER PUBLICATIONS

Extended European Search Report dated Apr. 23, 2024, issued in European Patent Application No. 22739564.7.

* cited by examiner

ELECTRONIC DEVICE AND METHOD FOR TRANSMITTING AND RECEIVING VIDEO THEREOF

CROSS-REFERENCE TO RELATED APPLICATION(S)

This application is a continuation application, claiming priority under § 365(c), of an International application No. PCT/KR2022/000175, filed on Jan. 5, 2022, which was based on and claimed the benefit of a Korean Patent Application number 10-2021-0004863, filed on Jan. 13, 2021, in the Korean Intellectual Property Office, the disclosure of which is incorporated by reference herein in its entirety.

TECHNICAL FIELD

The disclosure relates to an electronic device. More particularly, the disclosure relates to an electronic device which includes a camera for acquiring external images, and which can be connected to an external device through wireless communication, and an image transmission/reception method of an electronic device.

BACKGROUND ART

In line with development of mobile communication and hardware technologies, portable electronic devices (hereinafter, referred to as electronic devices) have been equipped with various functions. For example, electronic devices may provide various user experiences through various applications, in addition to voice communication functions according to the related art. In addition, electronic devices may be equipped with cameras such that external images can be acquired through the cameras, and image data acquired through image transmission/reception functions such as video communication, real-time streaming, and vlog can be transmitted to other devices.

Augmented reality (AR) refers to a technology for displaying virtual objects overlapped onto the real world seen by users' eyes, and users may wear AR devices (for example, AR glasses) to be provided with AR contents. AR glasses may include cameras, and image data captured by cameras of AR glasses may be transmitted to other devices.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

According to the mode of implementation of an AR device or the situation in which the same is used, communication with a network (for example, packet data network (PDN)) may be impossible. For example, if an AR device includes only a short-range wireless communication (for example, Wi-Fi) function and includes no cellular wireless communication (for example, 4th generation (4G), 5th generation (5G) cellular wireless communication) function, and if the same is not within the coverage of an access point, the same may not receive data (for example, AR contents) form the network.

Aspects of the disclosure are to address at least the above-mentioned problems and/or disadvantages and to provide at least the advantages described below. Accordingly, an aspect of the disclosure is to provide an electronic device capable of transmitting images acquired from an external device (for example, AR device) to a counterpart device in real time, and an image transmission/reception method of an electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a first camera, a communication module, and a processor operatively connected to the first camera and the communication module, wherein the processor is configured to establish a short-range wireless communication connection with an external device including a second camera, by using the communication module, establish a communication connection with a counterpart device, determine a format of image data to be transmitted to the counterpart device, select one of the first camera of the electronic device and the second camera of the external device, when the first camera is selected, packetize first image data acquired from the first camera according to the determined format, so as to transmit the packetized first image data to the counterpart device through the communication module, and when the second camera is selected, receive second image data from the external device, and packetize the second image data according to the determined format, so as to transmit the packetized second image data to the counterpart device through the communication module.

In accordance with another aspect of the disclosure, an image data transmission/reception method of an electronic device is provided. The image data method includes establishing a short-range wireless communication connection with an external device including a second camera, establishing a communication connection with a counterpart device, determining a format of image data to be transmitted to the counterpart device, selecting one of a first camera of the electronic device and the second camera of the external device, when the first camera is selected, packetizing first image data acquired from the first camera according to the determined format, so as to transmit the packetized first image data to the counterpart device, and when the second camera is selected, receiving second image data from the external device, and packetizing the second image data according to the determined format, so as to transmit the packetized second image data to the counterpart device.

Advantageous Effects of Invention

According to various embodiments of the disclosure, an electronic device may transmit images acquired from an external device (for example, AR device) to a counterpart device in real time and efficiently.

In addition, the electronic device may switch the camera used for image transmission, depending on the situation, between the camera of the AR device and the camera of the electronic device, and may guarantee that, in such a switching situation, image transmission with the counterpart device proceeds seamlessly.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
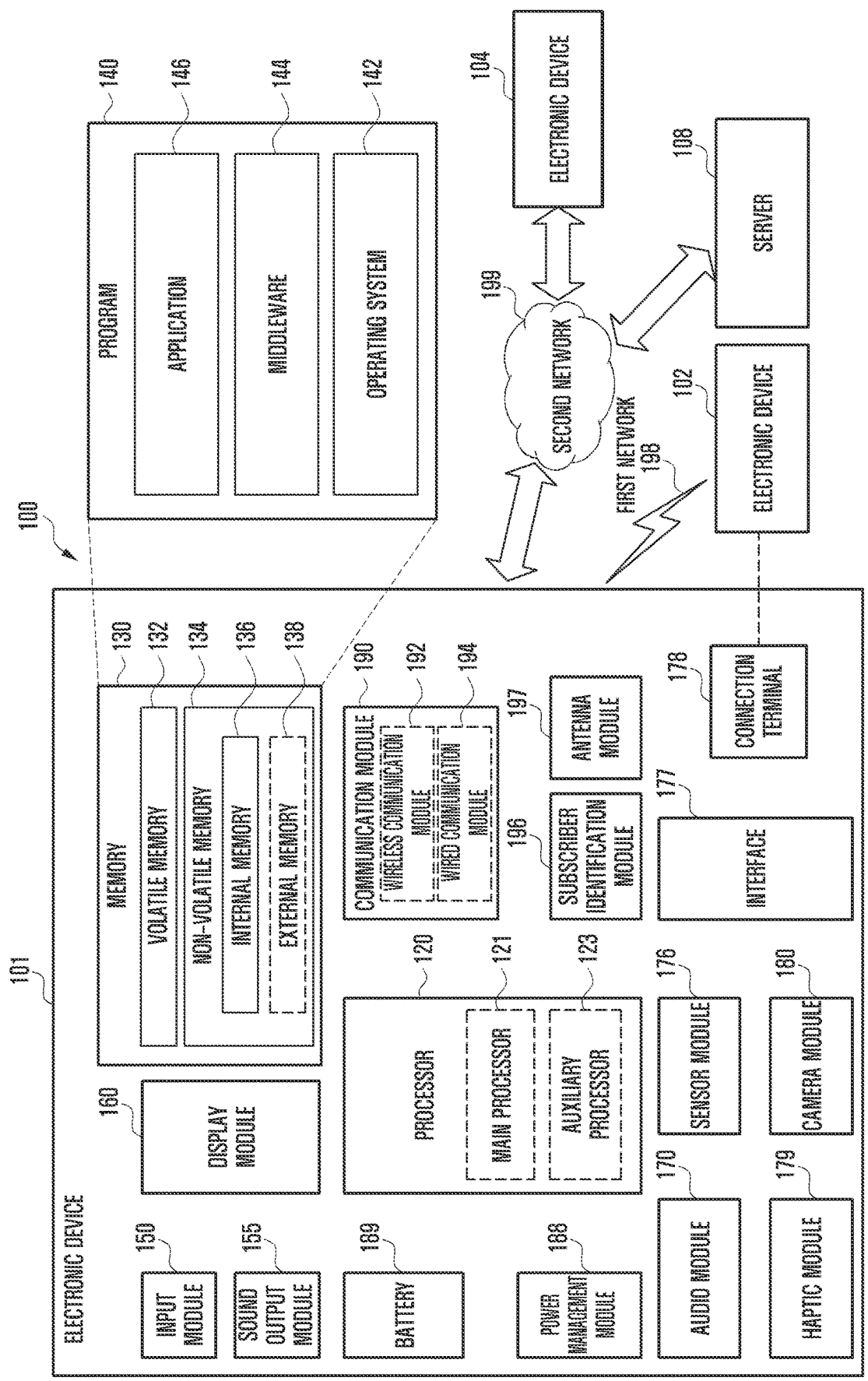
FIG. 1 is a block diagram of an electronic device in a network environment according to an embodiment of the disclosure.

FIG. 1 is a block diagram illustrating an example electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include patch array antennas and/or dipole array antennas.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
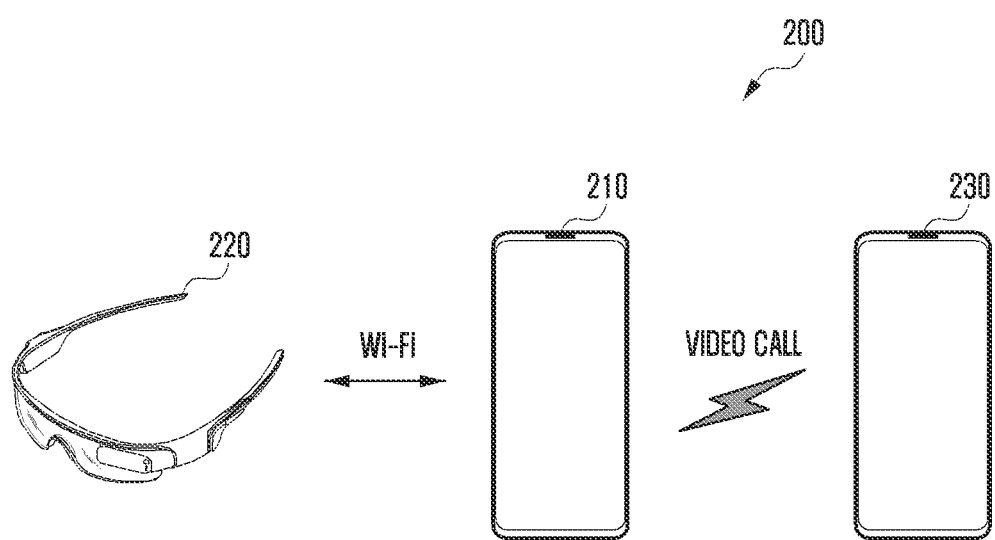
FIG. 2 illustrates a real-time image transmission/reception system including an AR device, an electronic device, and a counterpart device according to an embodiment of the disclosure.

FIG. 2 illustrates a real-time image transmission/reception system including an AR device, an electronic device, and a counterpart device according to an embodiment of the disclosure.

Referring to FIG. 2, a real-time image transmission/reception system 200 may include an AR device 220, an electronic device 210, and a counterpart device 230. In various embodiments herein, the electronic device 210 may be defined as a first electronic device or a primary device (PD), the AR device 220 may be defined as a second electronic device or a secondary device (SD), and the counterpart device 230 may be defined as a third electronic device or an external device (ED).

According to various embodiments, the electronic device 210 may be various devices having a wireless communication function and a camera, such as a smart phone or a tablet PC. The electronic device 210 may include at least a part of the configurations and/or functions of the electronic device of FIG. 1. The counterpart device 230 may be the same type of device as the electronic device 210 or may be a different type of device having a wireless communication function and a camera.

According to various embodiments, the electronic device 210 may execute (or perform) an image transmission/reception function (or operation) with the counterpart device 230. For example, the image transmission/reception function may include an operation of mutually transmitting or receiving an image acquired by a camera in real time, such as IMS-based video call and real-time streaming. The electronic device 210 may be connected to a network through short-range wireless communication (e.g., Wi-Fi and Bluetooth) and/or cellular wireless communication (e.g., 4G and 5G cellular communication), and may transmit or receive image data to or from the counterpart device 230 through a server device on the network.

According to various embodiments, the AR device 220 is a device for providing augmented reality (AR) to a user, and may be a device that a user can wear on his or her body. For example, the AR device 220 may be AR glasses or a head mounted display device. The AR device 220 may include a camera to acquire an external image.

According to various embodiments, the AR device 220 may be connected to the electronic device 210 by using short-range wireless communication (e.g., Wi-Fi and Bluetooth). For example, in a state in which the AR device 220 and the electronic device 210 establish a short-range wireless connection, the electronic device 210 may transmit AR content received from the server device on the network to the AR device 220 through the short-range wireless connection, and transmit data (e.g., a camera image) received from the AR device 220 to the network.

According to various embodiments, an image transmission/reception function (e.g., video call) with the counterpart device 230 may be initiated in a state where the electronic device 210 is connected to the AR device 220. Alternatively, while the electronic device 210 performs an image transmission/reception function with the counterpart device 230, the electronic device 210 and the AR device 220 may establish a short-range wireless communication connection. In this case, the electronic device 210 may transmit image data captured using a camera of the electronic device 210 or a camera of the AR device 220 to the counterpart device 230 in real time.

In FIG. 2, the electronic device 210 is illustrated as being connected to the AR device 220 through short-range wireless communication, but the disclosure is not limited thereto. Various embodiments of the disclosure may be applied even when other types of devices having a camera and a short-range wireless communication function are used, such as a laptop PC in a Dex mode and a secondary device in a call and message continuity (CMC) call, other than the AR device 220.

In the following, through FIGS. 3 to 15, various embodiments in which an image can be transmitted to the counterpart device 230 from various viewpoints by using the camera of the AR device 220 as well as the camera of the electronic device 210 in a real-time image transmission/reception function will be described. In addition, a method for efficiently transmitting an image when transmitting image data captured by the AR device 220 to the counterpart device 230 through the electronic device 210 and a camera change method between cameras of two devices will be described.

Figure 3:
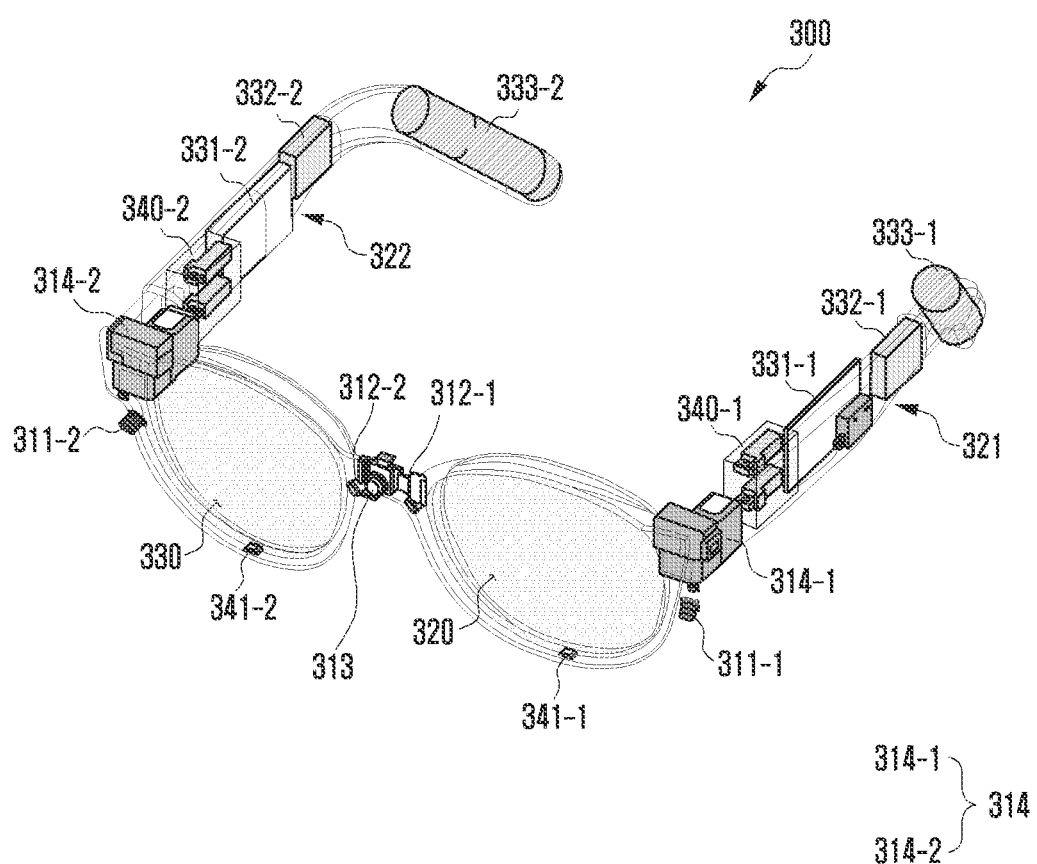
FIG. 3 illustrates an AR device according to an embodiment of the disclosure.

FIG. 3 illustrates an AR device according to an embodiment of the disclosure.

According to various embodiments, an AR device 300 may be worn on a head part of a user to provide an image related to an augmented reality service to the user. According to an embodiment, the AR device 300 may provide an augmented reality service which outputs at least one virtual object so as to be superimposed on an area determined as a field of view (FoV) of a user. For example, the area determined as the field of view of the user may be an area including the entire or at least a part of a display module 314 of the AR device 300, as an area determined to be recognizable by a user wearing the AR device 300 through the AR device 300.

According to various embodiments, the AR device 300 may include the display module 314, a camera module, a first support portion 321, and/or a second support portion 322.

According to various embodiments, the AR device 300 may include multiple pieces of glass (e.g., a first glass 320 and/or a second glass 330) corresponding to both eyes (e.g., a left eye and/or a right eye) of a user, respectively. The multiple pieces of glass may include at least a part of the display module 314. For example, the first glass 320 corresponding to a left eye of a user may include a first display module 314-1, and the second glass 330 corresponding to a right eye of the user may include second display modules 314-2. For example, the AR device 300 may be configured in the form of at least one of glasses, goggles, a helmet, or a hat, but is not limited thereto.

According to various embodiments, the AR device 300 may include at least one camera module. For example, the AR device 300 may include a front camera 313 for capturing an image corresponding to a field of view (FoV) of a user and/or measuring a distance from an object, eye tracking cameras 312-1 and 312-2 for identifying a direction of a user's gaze, and/or recognizing cameras 311-1 and 311-2 (gesture camera) for recognizing a predetermined space. The front camera 313 may photograph the front, for example, the front direction of the AR device 300, and the eye tracking cameras 312-1 and 312-2 may photograph the rear, for example, a direction opposite to the photographing direction of the front camera 313. For example, the eye tracking cameras 312-1 and 312-2 may at least partially photograph both eyes of a user wearing the AR device 300, which are present at the rear of the AR device 300, the both eyes including a left and a right eye of the user. According to an embodiment, the first support portion 321 and/or the second support portion 322 may include printed circuit boards (PCBs) 331-1 and 331-2, speakers 332-1 and 332-2, and/or batteries 333-1 and 333-2.

According to various embodiments, the display module 314 may be disposed in a frame of the AR device 300, and may include a condensing lens (not shown) and/or a transparent waveguide tube (not shown) in glass (e.g., the first glass 320 and the second glass 330). For example, the transparent waveguide tube may be at least partially positioned in a part of the glass. According to an embodiment, the light emitted from the display module 314 may be incident on one end of the glass through the first glass 320 and the second glass 330, and the incident light may be transmitted to a user through a waveguide tube and/or a waveguide (e.g., a waveguide) formed in the glass. The waveguide tube may be made of glass, plastic, or polymer, and may include a nanopattern formed on one surface of the inside or outside thereof, for example, a polygonal or curved grating structure. According to an embodiment, the incident light may be propagated or reflected inside the waveguide tube by the nanopattern and provided to a user. According to an embodiment, the waveguide may include at least one of at least one diffractive element (e.g., a diffractive optical element (DOE) and a holographic optical element (HOE)) or a reflective element (e.g., a reflective mirror). According to an embodiment, the waveguide may guide the display light emitted from a light source unit to a user's eyes by using the at least one diffractive element or reflective element.

Referring to FIG. 3, the first support portion 321 and/or the second support portion 322 may include the printed circuit boards 331-1 and 331-2 for transmitting an electrical signal to each component of the AR device 300, the speakers 332-1 and 332-2 for outputting an audio signal, the batteries 333-1 and 333-2, and/or hinge portions 340-1 and 340-2 for at least partially coupling to the frame of the AR device 300. According to an embodiment, the speakers 332-1 and 332-2 may include a first speaker 332-1 for transmitting an audio signal to a left ear of a user, and a second speaker 332-2 for transmitting an audio signal to a right ear of the user. According to an embodiment, the AR device 300 may include a plurality of batteries 333-1 and 333-2, and may supply power to the printed circuit boards 331-1 and 331-2 through a power management module.

Referring to FIG. 3, the AR device 300 may include microphones 341-1 and 341-2 for receiving a user's voice and ambient sound. The AR device 300 may include at least one light-emitting device (illumination LED) for increasing the accuracy of at least one camera (e.g., the front camera 313, the eye tracking cameras 312-1 and 312-2, and/or the recognizing cameras 311-1 and 311-2). For example, the light-emitting device may be used as an auxiliary means for increasing the accuracy at the time of photographing a pupil of a user by using the eye tracking cameras 312-1 and 312-2, and the light-emitting device may use an infrared light emitting diode (IR LED) having an infrared wavelength rather than a visible light wavelength. For another example, the light-emitting device may be used as an auxiliary means when it is not easy to detect a subject to be photographed due to a dark environment or the mixing of various light sources, and reflected light at the time of photographing a gesture of a user by using the recognizing cameras 311-1 and 311-2.

According to various embodiments, the AR device 300 may include a communication module (not shown) configured to support wireless communication with an external device. The communication module may be disposed on the frame, the first support portion 321, or the second support portion 322, and may provide short-range wireless communication such as Wi-Fi. According to an embodiment, the AR device 300 may use the communication module to transmit image data acquired through at least one camera (e.g., the front camera 313) to an adjacent electronic device (e.g., the electronic device 101 of FIG. 1).

Figure 4:
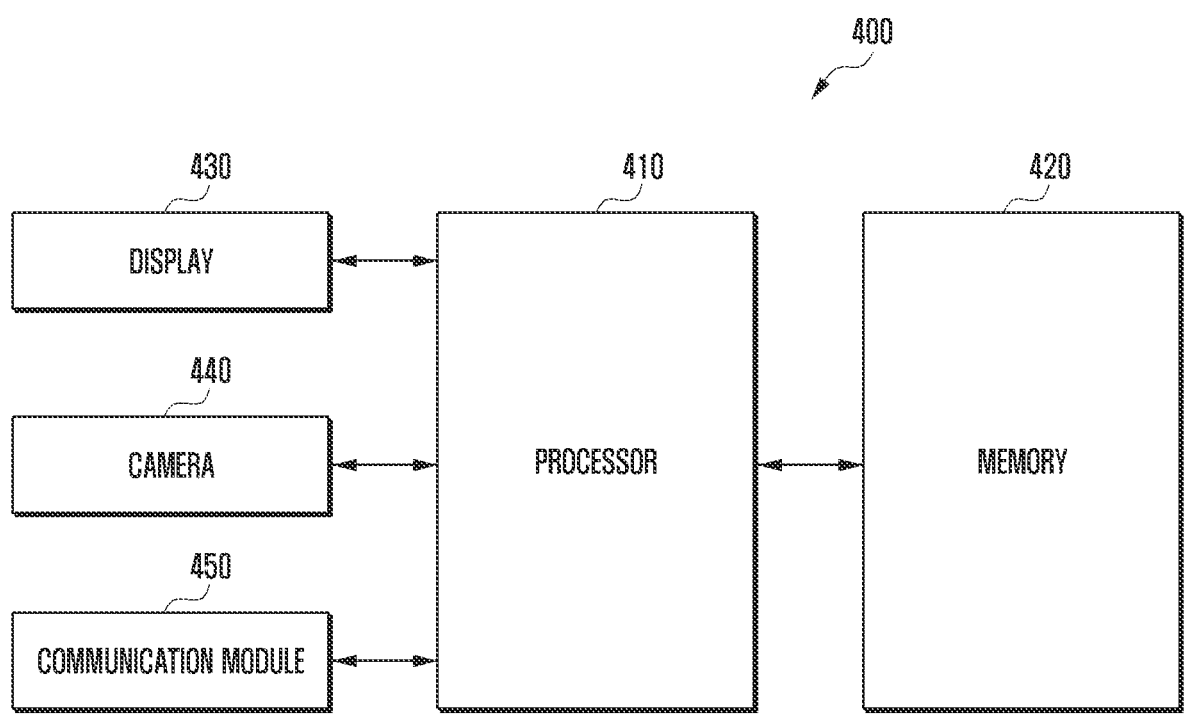
FIG. 4 is a block diagram of an electronic device according to an embodiment of the disclosure.

FIG. 4 is a block diagram of an electronic device according to an embodiment of the disclosure.

Referring to FIG. 4, an electronic device 400 (e.g., the electronic device 101 of FIG. 1) may include a processor 410 (e.g., the processor 120 of FIG. 1), a memory 420 (e.g., the memory 130 of FIG. 1), a display 430 (e.g., the display module 160 of FIG. 1), a camera 440 (e.g., the camera module 180 of FIG. 1), and a communication module 450 (e.g., the communication module 190 of FIG. 1), and a part of the configurations shown in some embodiments may be omitted or substituted. The electronic device 400 may further include at least a part of the configurations and/or functions of the electronic device 101 of FIG. 1. At least a part of the respective shown (or not shown) configurations of the electronic device 400 may be mutually operatively, functionally, and/or electrically connected.

According to various embodiments, the display 430 may be implemented as one of a liquid crystal display (LCD), a light-emitting diode (LED) display, and an organic light-emitting diode (OLED) display, but is not limited thereto. The display 430 may be configured as a touch screen configured to detect a touch and/or proximity touch (or hovering) input using a part (e.g., a finger) of the body of a user or an input device (e.g., a stylus pen). The display 430 may include at least a part of the configurations and/or functions of the display module 160 of FIG. 1. The display 430 may be at least partially flexible, and may be implemented as a foldable display 430 or a rollable display 430.

According to various embodiments, the communication module 450 may include various hardware and/or software configurations for communicating with an external device via a wireless communication network. The communication module 450 may include a cellular communication module that supports cellular wireless communication (e.g., 4G and 5G cellular communication) and a short-range wireless communication module (e.g., the wireless communication module 192 of FIG. 1) that supports short-range wireless communication (e.g., Wi-Fi and Bluetooth). For example, the electronic device 400 may transmit or receive image data to or from a counterpart device (e.g., the counterpart device 230 of FIG. 2) via the network by using the cellular wireless communication module or the short-range wireless communication module, and receive image data from an adjacent external device (e.g., the AR device 220 of FIG. 2) by using the short-range wireless communication module. The communication module 450 may include at least a part of the configurations and/or functions of the communication module 190 of FIG. 1.

According to various embodiments, the camera 440 may capture an external image. The electronic device 400 may include at least one camera 440 on front and/or rear surfaces thereof, and may drive one of the at least one camera to capture an external image including a subject. The camera 440 may be exposed from a housing of the electronic device 400 to the outside, and at least one (e.g., a front camera) of the camera 440 may be disposed under the display 430. A module of the camera 440 may include at least one of a lens assembly, a flash, an image sensor, an image stabilizer, a buffer memory, and an image signal processor, but is not limited thereto. The camera 440 may include at least a part of the configurations and/or functions of the camera module 180 of FIG. 1.

According to various embodiments, the memory 420 may include a volatile memory and/or a non-volatile memory to temporarily or permanently store various data. The memory 420 may include at least a part of the configurations and/or functions of the memory 130 of FIG. 1, and may store the program 140 of FIG. 1.

According to various embodiments, the memory 420 may store various instructions which can be executed by the processor 410. Such instructions may include control commands such as arithmetic and logical operations, data movement, and input/output which can be recognized by the processor 410.

According to various embodiments, the processor 410 is a configuration capable of performing an operation or data processing relating to control and/or communication of each component of the electronic device 400, and one or more processors 410 may be configured. The processor 410 may include at least a part of the configurations and/or functions of the processor 120 of FIG. 1.

According to various embodiments, operation and data processing functions which can be implemented on the electronic device 400 by the processor 410 are not be limited but, hereinafter, various embodiments of an operation of selecting a camera of an external device or the electronic device 400 as an image source while the electronic device 400 performs an image transmission/reception function with a counterpart device, and switching the image source according to an event and an operation of determining an image format such that a connection with the counterpart device is seamlessly and smoothly performed when an image of the external device is relay-transmitted will be described in detail. The operations of the processor 410 to be described later may be performed by loading instructions stored in the memory 420.

According to various embodiments, the processor 410 may establish a short-range wireless communication connection with an external device (e.g., the AR device 300 of FIG. 3) by using the communication module 450. The short-range wireless communication may be Wi-Fi and Bluetooth, but is not limited thereto. The electronic device 400 may receive image data acquired by a camera of the external device through the established short-range wireless communication connection, and may transmit AR content and a control signal to the external device.

According to various embodiments, the processor 410 may establish a connection for an image transmission/reception function with a counterpart device (e.g., the counterpart device 230 of FIG. 2). For example, the image transmission/reception function may be a function of mutually transmitting or receiving an image acquired by a camera in real time, such as an IP multimedia subsystem (IMS)-based video call or real-time streaming According to an embodiment, the electronic device 400 may request a video call from the counterpart device or receive a video call request from the counterpart device while establishing a short-range wireless communication connection with the external device, or establish a short-range wireless communication connection with the external device while a video call with the counterpart device is connected.

According to various embodiments, in a case of establishing a connection for an image transmission/reception function with a counterpart device in a state of being connected to an external device via short-range wireless communication, the processor 410 may select one of a camera 440 (or a first camera) of the electronic device 400 and a camera (or a second camera) of the external device to acquire an image to be transmitted to the counterpart device. For example, when a user is wearing an AR device which is an external device, a front camera of the external device may acquire an image in the same direction as the user's gaze. In addition, the electronic device 400 may acquire an image of the surroundings through a front or rear camera. A user's request may be to transmit image data acquired by a camera of the AR device to the counterpart device when the user intends to transmit the direction the user is looking in to the counterpart device, or may be to transmit image data acquired by the camera 440 of the electronic device 400 to the counterpart device when the user intends to transmit an image of a specific object captured by the rear camera or the user's face to the counterpart device.

According to an embodiment, the processor 410 may select the camera of the AR device as an image source by default in a state in which the electronic device 400 is connected to the AR device. According to another embodiment, the processor 410 may provide a GUI capable of selecting an image source through the display 430, and select one of the camera of the AR device or the camera 440 of the electronic device 400 according to a user selection on the GUI.

According to various embodiments, when the camera 440 of the electronic device 400 is selected, the processor 410 may transmit image data acquired through the camera 440 (e.g., the front camera or rear camera) disposed in the electronic device 400 to the counterpart device through the communication module 450.

According to various embodiments, the processor 410 may transmit image data acquired by the camera 440 to the counterpart device via a network according to a predetermined format (or protocol) of the image transmission/reception function. For example, a real-time transport protocol (hereinafter, RTP) may be used. The RTP is a protocol which is the most widely used for video, audio, video conference, and the like among various transport protocols for real-time media transmission. When the electronic device 400 connects a video call with the counterpart device, the video call connection may be based on an Internet protocol multimedia subsystem (IMS), and real-time media transmission such as voice call (e.g., voice over LTE (VoLTE)) and video call (e.g., video over LTE (ViLTE)) based on the IMS may use the RTP.

According to various embodiments, when the electronic device 400 initiates an IMS-based video call with the counterpart device, an image format supported by each device may be exchanged using a session description protocol (SDP) message included in a session initiation protocol (SIP) message, and an image format to be used at the time of transmitting or receiving an image may be negotiated. The image format may include at least one of an RTP payload type, a video codec, a maximum bit rate (or maximum speed), and a resolution.

Table 1 below is an example of a video codec-related SDP message in an SIP message exchanged between the electronic device 400 and the counterpart device during a video call connection process. For example, the electronic device 400 may support RTP payload type=118, video codec of H.264, a maximum bit rate of 384 kbps, and a resolution of 240*320.

TABLE 1

INVITE [CSeq: 2 INVITE]
m=video 0 RTP/AVPF 118
b=AS:384
b=RS:801
b=RR:2401
a=rtpmap: 118 H264/90000
a=imageattr:118 send [x=240,y=320] recv [x=240,y=320]
a=fmtp:118 profile-level-id=42800C;packetization-mode=1;
sprop-parameter-
sets=Z0KADNoPCmQ=,aM4G4g==;level-asymmetry-allowed=1
a=framerate:15
a=extmap:7 urn:3gpp:video-orientation When the electronic device 400 transmits an SIP message including an SDP message shown in Table 1 above, the counterpart device may transmit supportable codec information via a response message (e.g., 200 OK). Table 2 below is an example of a response message transmitted by the counterpart device to the electronic device 400.

TABLE 2

SIP/2.0 200 OK [CSeq: 2 INVITE]
m=video 0 RTP/AVPF 118
b=AS:384
b=RS:804
b=RR:2401
a=rtpmap: 118 H264/90000
a=fmtp:118 profile-level-id=42800C;packetization-mode=1;
sprop-parameter-
sets=Z0KADNoPCmQ=,aM4G4g==;level-asymmetry-allowed=1
a=imageattr:118 send [x=240,y=320] recv [x=240,y=320]

When the electronic device 400 transmits an ACK in response to the response message (200 OK) of the counterpart device, an image format of the RTP is negotiated, and image data may be transmitted or received according to the corresponding image format.

The above embodiment relates to an SIP message transmitted by the electronic device 400 and the counterpart device when the electronic device 400 requests a video call from the counterpart device, and conversely, when the counterpart device requests a video call from the electronic device 400, the counterpart device may transmit an invite message, and the electronic device 400 may transmit a 200 OK message in response thereto.

According to various embodiments, the processor 410 may determine an image format (e.g., an RTP payload type, a video codec, a maximum bit rate, and a resolution) of image data to be transmitted to the counterpart device according to the image format negotiated according to the SIP message exchange, and packetize an image acquired by the camera 440 of the electronic device 400 and/or a camera of an external device according to the corresponding image format, so as to transmit the packetized image to the counterpart device via the network.

According to various embodiments, when the camera of the external device is selected as an image source of an image transmission/reception function, the processor 410 may receive image data acquired by the camera of the external device from the external device, and transmit the acquired image data to the counterpart device through the communication module 450.

According to various embodiments, the processor 410 may process image data of the camera of the external device received from the external device, based on the same format as image data of the camera 440 of the electronic device 400 and/or a method of processing image data of the camera 400, and transmit the processed image data to the counterpart device. For example, the processor 410 may process the image data received from the external device and then transmit the processed image data to the counterpart device, based on at least one of the same RTP payload type, video codec, maximum bit rate, and resolution as in the case where the camera 440 of the electronic device 400 is selected and the image data of the camera 440 is transmitted to the counterpart device.

According to various embodiments, the processor 410 may negotiate an image format to be used when the counterpart device transmits or receives image data by using an image format which can be supported by both the external device and the electronic device 400 during a video call connection process. According to an embodiment, the processor 410 may receive image format information (or first image format information) which can be supported by the external device during a short-range wireless communication connection (or pairing) with the external device, and store the image format information in the memory 420. According to another embodiment, the processor 410 may request and receive, from the external device, image format information which can be supported, at the time of connecting a video call with the counterpart device.

According to various embodiments, based on image format information (or first image format information) of the external device received from the external device and image format information (or second image format information) which can be supported by the electronic device 400, the processor 410 may determine image format information (or third image format information) which can be supported by both the external device and the electronic device 400. The processor 410 may generate an SDP, based on the image format information (e.g., a video codec) which can be supported by both the external device and the electronic device 400, and transmit an SIP message to the counterpart device. The electronic device 400 may finally determine an image format (e.g., a video codec) to be used during image transmission/reception via the SIP and SDP messages exchanged with the counterpart device, and may transmit the determined image format information to the external device. The external device may use the received image format to encode image data of the camera of the external device and transmit the encoded image data to the electronic device 400. Since the electronic device 400 may negotiate an image format with the counterpart device according to the image format information which can be supported by both the external device and the electronic device, even when an image source is changed from the camera 440 of the electronic device 400 to the camera of the external device or vice versa during image transmission/reception with the counterpart device, the electronic device 400 may transmit image data of the same image format to the counterpart device. This embodiment will be described in more detail with reference to FIG. 7.

When the electronic device 400 receives image data from the camera of the external device and transmits the image data to the counterpart device, the electronic device may use one of the following two schemes (e.g., an RTP relay scheme and a bit stream relay scheme).

According to an embodiment (e.g., an RTP relay scheme), the external device may transmit an RTP packet (e.g., a second RTP packet) including image data (e.g., second image data) of the camera of the external device. In this case, the processor 410 may change header information of the RTP packet received from the external device, based on header information of an RTP packet (e.g., a first RTP packet) when image data (e.g., first image data) of the camera 440 of the electronic device 400 is transmitted to the counterpart device. For example, the processor 410 may configure a synchronization source (SSRC) ID and a payload type in the header information of the second RTP packet received from the external device to be the same as those in header information of a first RTP packet, consecutively configure a sequence number, and configure a timestamp at a predetermined interval.

Accordingly, even when an image source is changed from the camera 440 of the electronic device 400 to the camera of the external device or vice versa during image transmission/reception with the counterpart device, since the electronic device 400 performs transmission while maintaining main information such as an SSRC, a timestamp, and a sequence number of an RTP header, the counterpart device may perform recognition as a single continuous RTP stream. On the other hand, in a case of performing transmission using other RTP headers, the counterpart device (or a server on the network) may drop or ignore an RTP packet of a corresponding stream, and according to an embodiment of the disclosure, the counterpart device (or a server on the network) performs recognition as a single RTP stream, and thus image transmission/reception may not be interrupted.

An embodiment of changing header information in an RTP relay scheme and a structure of an RTP packet will be described in more detail with reference to FIGS. 10A and 10B.

According to another embodiment (e.g., a bit stream relay scheme), the external device may transmit image data of the camera of the external device as encoded bit stream data to the electronic device 400, and the electronic device 400 may perform RTP packetizing of the data to transmit the data to the counterpart device. In this case, the external device may encode image data of the camera 440 by using image format information (e.g., the third image format information which can be supported by both the external device and the electronic device 400) received from the electronic device 400, and then transmit the encoded image data to the electronic device 400 in a unit suitable for an RTP payload, and the electronic device 400 may finally perform RTP packetizing of the data to transmit the data to the counterpart device.

According to an embodiment of the disclosure, even when an image source is changed from the camera 440 of the electronic device 400 to the camera of the external device or vice versa, since the electronic device 400 performs RTP packetizing, and performs transmission while maintaining main information such as an SSRC, a timestamp, and a sequence number of an RTP header, the counterpart device may perform recognition as a single continuous RTP stream.

According to various embodiments, when an image transmission/reception function with the counterpart device is initiated, the processor 410 may select one of the camera 440 of the electronic device 400 and the camera of the external device as an image source. According to an embodiment, when the image transmission/reception function is initiated in a state where a short-range wireless communication connection with the external device is established, the electronic device 400 may select the camera of the external device by default.

According to various embodiments, while receiving image data of the camera of the external device and transmitting the image data to the counterpart device, when a predetermined event is detected, the processor 410 may change image data to be transmitted to the counterpart device into image data acquired from the camera 440 of the electronic device 400. For example, the processor 410 may change an image source in response to an event such as a user's selection, a screen displayed on the display 430, a battery capacity of the external device, or detachment of the external device.

According to an embodiment, the processor 410 may provide, on the display 430, a graphic user interface (GUI) capable of selecting a change of an image source, and change the image source to the camera 440 of the electronic device 400, based on a user selection on the GUI. This embodiment will be described in more detail with reference to FIGS. 11A and 11B.

According to another embodiment, when a screen to be displayed on the display 430 is a screen of a predetermined type or includes a predetermined character, the processor 410 may determine that the image source change event has occurred. The processor 410 may detect that a security-related application is executed, or detect that a security screen is rendered on a foreground surface.

For example, when a security screen (e.g., an unlock screen or key guard) to be displayed on the display 430 of the electronic device 400 is generated, the processor 410 may change an image source to the camera 440 of the electronic device 400. In addition, when a screen including a plurality of character patterns or a character used when entering a password, such as "*", is generated or a character related to input of security information such as password input is included, the processor 410 may change the image source to the camera 440 of the electronic device 400. This embodiment will be described in more detail with reference to FIGS. 12A, 12B, and 13.

According to another embodiment, when a battery capacity of the external device is less than or equal to a reference value, the processor 410 may determine that the image source change event has occurred. The processor 410 may periodically receive state information of the external device via a short-range wireless communication connection with the external device, and the received state information may include battery capacity information of the external device. Based on the received battery capacity information, the processor 410 may change an image source to the camera 440 of the electronic device 400 when the battery capacity is lowered to the reference value or less. This embodiment will be described in more detail with reference to FIG. 14.

According to another embodiment, when a user releases the wearing of the external device, the processor 410 may determine that the image source change event has occurred. The external device may include a sensor configured to determine whether the external device is worn on a user's body, and a sensor signal may be periodically transmitted to the electronic device 400 via a short-range wireless communication connection. When the external device is removed, the electronic device 400 and the external device may release the established short-range wireless communication connection. When the short-range wireless communication connection with the external device is released, the processor 410 may change an image source to the camera 440 of the electronic device 400. This embodiment will be described in more detail with reference to FIG. 15.

According to an embodiment, when an image source change event occurs, the processor 410 may transmit, to the external device, a request for instructing to stop transmission of image data. The external device may stop transmitting the image data of the camera of the external device, and the electronic device 400 may transmit image data acquired by the camera 440 of the electronic device 400 to the counterpart device via the network.

According to another embodiment, the processor 410 may not transmit image data received from the external device to the counterpart device when an image source change event occurs. In this case, the image data of the external device is continuously transmitted to the electronic device 400, but the electronic device 400 may drop the image data and transmit the image data of the camera 440 of the electronic device 400 to the counterpart device. According to an embodiment, when a predetermined time elapses after an image source is stored as the camera 440 of the electronic device 400, the processor 410 may transmit, to the external device, a request for instructing to stop transmission of image data. According to an embodiment, when an image source change event is an event in which the camera of the external device can be continuously used (e.g., a user's selection, or the display of a security screen), the processor 410 may use a method of performing dropping in a state of maintaining the reception of image data of the external device, and when the image source change event is an event in which continuous use of the external device is difficult (e.g., battery capacity degradation, removal, or disconnection), the processor may transmit a request for instructing to stop transmission of image data in response to the occurrence of the event.

According to various embodiments, when an image source change event is ended (e.g., the display of a security screen is removed), the processor 410 may change an image source to the camera of the external device again. In this case, the electronic device 400 may transmit, to the external device, a request for instructing resumption of image data transmission.

Figure 5:
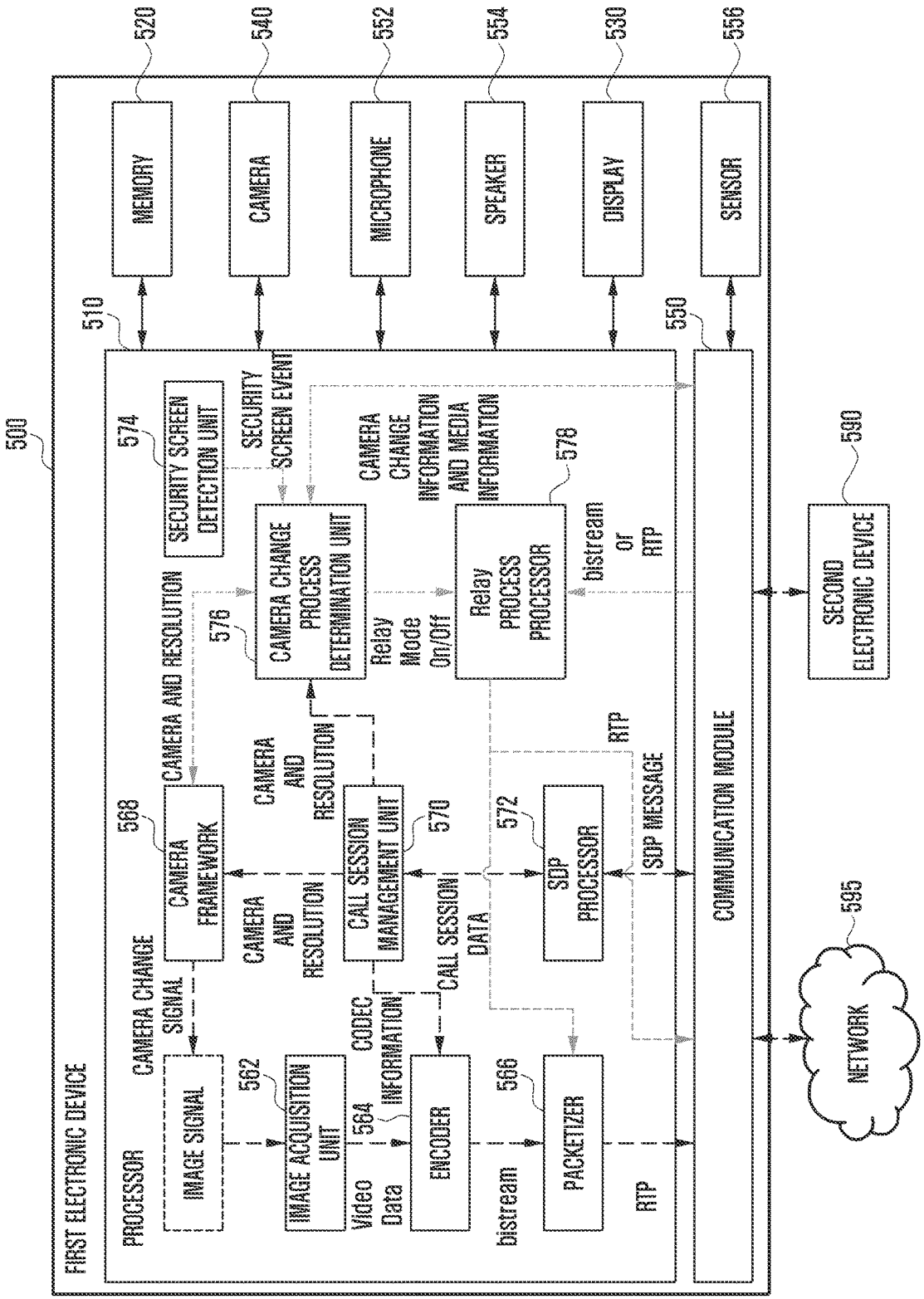
FIG. 5 is a block diagram of a configuration for real-time image transmission/reception of a first electronic device according to an embodiment of the disclosure.

FIG. 5 is a block diagram of a configuration for real-time image transmission/reception of a first electronic device according to an embodiment of the disclosure.

Referring to FIG. 5, a first electronic device 500 (e.g., the electronic device 101 of FIG. 1, the electronic device 210 of FIG. 2, or the electronic device 400 of FIG. 4) may include a processor 510, a communication module 550, a memory 520, a camera 540, a microphone 552, a speaker 554, a display 530, and a sensor 556. In FIG. 5, the configurations and/or functions of the communication module 550, the memory 520, the camera 540, the microphone 552, the speaker 554, the display 530, and the sensor 556 may be the same as the configurations and/or functions of the communication modules 190 and 450, the memories 130 and 420, the cameras 180 and 440, a microphone (e.g., a microphone of the input module 150), a speaker (e.g., the sound output module 155), the displays 160 and 430, and the sensor 176 described in FIG. 1 and/or FIG. 4, respectively.

Referring to FIG. 5, the processor 510 may include an image acquisition unit 562, an encoder 564, a packetizer 566, a camera framework 568, a call session management unit 570, an SDP processor 572, a camera change process determination unit 576, a relay process processor 578, and a security screen detection unit 574, and a part of the configurations shown in some embodiments may be omitted or substituted. Each illustrated configuration of the processor 510 may be a software module which can be executed in the processor 510, and may be, for example, an application, a framework, or a driver. According to an embodiment, a part (e.g., the encoder 564 and the packetizer 566) of the illustrated configurations may be configured as a separate hardware module. The processor 510 may be operatively, functionally, and/or electrically connected with the communication module 550, the memory 520, the camera 540, the microphone 552, the speaker 554, the display 530, and the sensor 556.

Hereinafter, an operation of each configuration of the processor 510 in a case where an image transmission/reception function (e.g., IMS video call) is performed with a counterpart device (e.g., the counterpart device 230 of FIG. 2) in a state in which a short-range wireless communication connection is established with a second electronic device 590 (e.g., the AR device 220 of FIG. 2) will be described in detail.

According to various embodiments, when an image source to be transmitted to the counterpart device is determined to be the camera 540 of the first electronic device 500, image data acquired by the camera 540 may be processed by the image acquisition unit 562, the encoder 564, and the packetizer 566 and transmitted to a network 595 through the communication module 550.

According to various embodiments, the image acquisition unit 562 may receive the captured image data from the camera 540 in real time. The image data acquired by the image acquisition unit 562 may be transmitted to the encoder 564, and the encoder 564 may encode the image data. In this case, the encoder 564 may encode the image data, based on codec information received from the call session management unit 570. The image data encoded by the encoder 564 may be transmitted to the packetizer 566 via a bit stream, and the packetizer 566 may add RTP header information to the received image data to transmit the image data to the communication module 550 via a real-time transport protocol (RTP) stream. The communication module 550 may transmit the RTP stream to the counterpart device via the network 595 by using short-range wireless communication or cellular wireless communication.

According to various embodiments, the call session management unit 570 may perform a function of managing a video call session with the counterpart device. For example, the call session management unit 570 may determine one of the camera 540 of the first electronic device 500 or a camera of the second electronic device 590 as an image source to be used during a video call. The image source may be determined to be the camera of the second electronic device 590 when the first video call is connected, or may be selected according to a user input on a GUI, and may be changed to another camera 540 according to an image source change event during a video call.

According to various embodiments, the first electronic device 500 may negotiate an image format to be used during image data transmission/reception by using an image format which can be supported by both the first electronic device 500 and the second electronic device 590 in a video call connection process with the counterpart device. The image format may include at least one of a resolution, an RTP payload type, a video codec, and a maximum bit rate of image data. Accordingly, even when the image source is changed from the camera 540 of the first electronic device 500 to the camera of the second electronic device 590, data of the same image format may be transmitted to the counterpart device.

According to various embodiments, the SDP processor 572 may generate an SIP message by generating an SDP, based on image format information (e.g., a video codec) which can be supported by both the first electronic device 500 and the second electronic device 590. The first electronic device 500 may finally determine an image format (e.g., a video codec) to be used during image transmission/reception through SIP and SDP messages exchanged with the counterpart device, and may transmit the determined image format information to the second electronic device 590. The SDP processor 572 may transmit call session data including the determined image format information to the call session management unit 570.

According to various embodiments, the call session management unit 570 may perform a function of determining an image source and/or an image format and managing a video call session, based on image session data received from the SDP processor 572.

According to various embodiments, the call session management unit 570 may transmit, to another configuration, a camera (e.g., the camera 540 of the first electronic device 500 or the camera of the second electronic device 590) determined as an image source and/or an image format. The call session management unit 570 may transmit video codec information to the encoder 564. Accordingly, the encoder 564 may encode image data acquired by the camera 540 according to the received video codec information. In addition, the call session management unit 570 may transmit information on a resolution and the camera 540 determined as the image source to the camera framework 568 and the camera change process determination unit 576.

According to various embodiments, the security screen detection unit 574 may detect an event in which a security screen (e.g., an unlock screen or key guard) is displayed on the display 530, and transmit the same to the camera change process determination unit 576. For example, when a screen to be displayed on the display 530 includes a security screen (e.g., an unlock screen or key guard), includes a plurality of character patterns or a character used when inputting security information (e.g., a password), such as "*", and/or includes a character related to input of security information such as password input, the security screen detection unit 574 may determine that a security event has occurred.

According to various embodiments, the camera change process determination unit 576 may change an image source of image data to be transmitted to the counterpart device from the camera 540 of the first electronic device 500 to the camera of the second electronic device 590 or vice versa, according to an image source change event. For example, the camera change process determination unit 576 may perform a process of changing an image source when the occurrence of a security event is received from the security screen detection unit 574, when an event such as a low battery, removal from a user's body, or disconnection is received from the second electronic device 590, and/or when the camera 540 of another device is selected according to a user input on the GUI. The camera change process determination unit 576 may transmit image source change information to the second electronic device 590 through the communication module 550. In addition, when the camera 540 of the first electronic device 500 is determined as the image source, the camera change process determination unit 576 may transmit a mode change and a resolution to operate to the camera framework 568, and the camera framework 568 may acquire image data to be transmitted to the counterpart device by driving the camera 540 according to the received information. Further, the camera change process determination unit 576 may transmit an image source change to the relay process processor 578.

According to various embodiments, when the camera of the second electronic device 590 is determined as the image source, the relay process processor 578 may process the received image data according to RTP information and an image format of image data acquired and transmitted by the camera 540 of the first electronic device 500.

According to an embodiment (e.g., an RTP relay scheme), the second electronic device 590 may transmit an RTP packet (e.g., a second RTP packet) including image data (e.g., second image data) of the camera of the second electronic device 590. In this case, the relay process processor 578 may change header information of the RTP packet received from the second electronic device 590, based on header information of an RTP packet (e.g., a first RTP packet) when image data (e.g., first image data) of the camera 540 of the first electronic device 500 is transmitted to the counterpart device. For example, the relay process processor 578 may configure a synchronization source (SSRC) ID and a payload type in the header information of the second RTP packet received from the second electronic device 590 to be the same as those in header information of a first RTP packet, consecutively configure a sequence number, and configure a timestamp at a predetermined interval.

According to another embodiment (e.g., a bit stream relay scheme), the second electronic device 590 may transmit image data of the camera 540 to the first electronic device 500 as encoded bit stream data. In this case, the relay process processor 578 may transmit the received bit stream to the packetizer 566, and the packetizer 566 may transmit the bit stream to the counterpart device via RTP packetizing.

Figure 6:
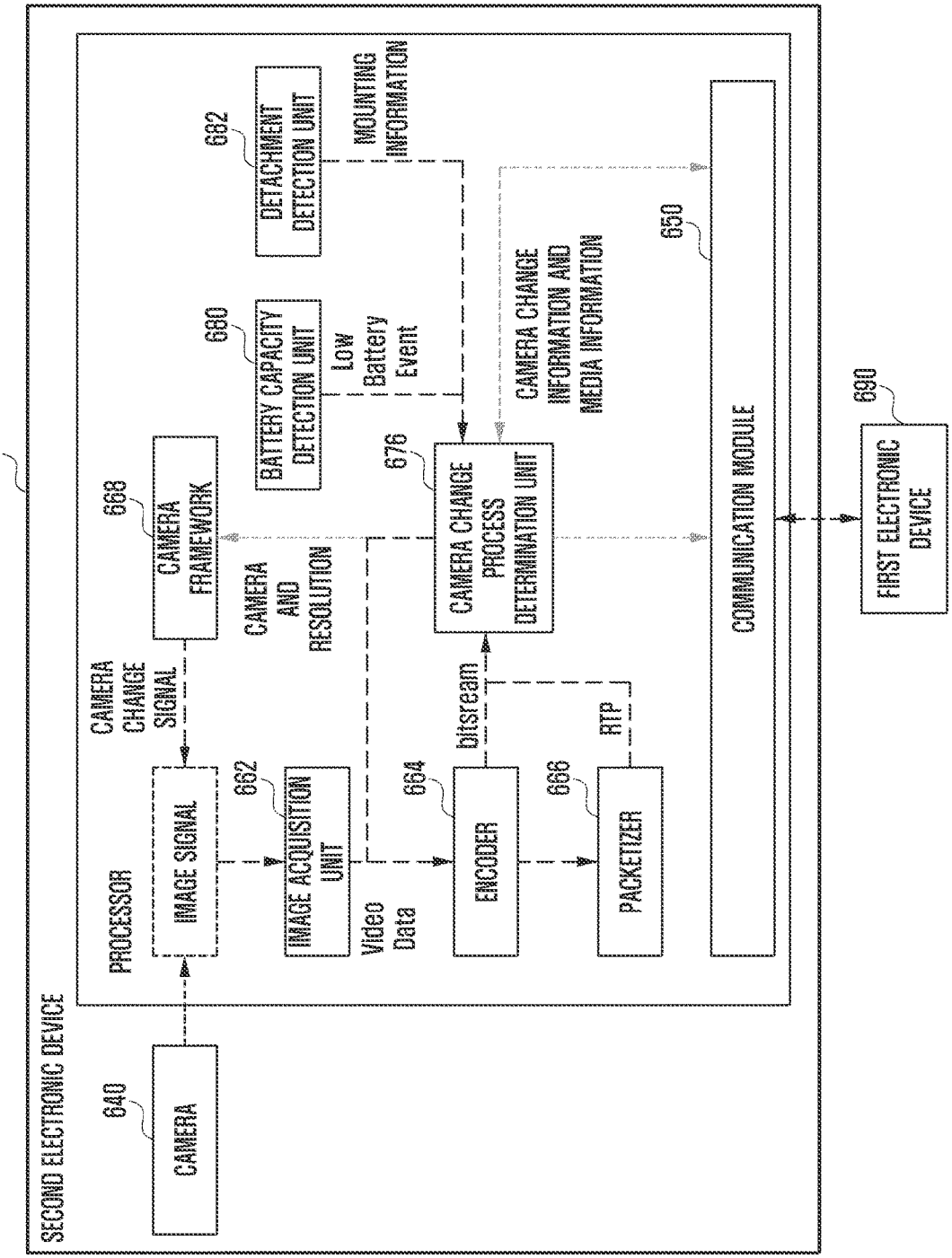
FIG. 6 is a block diagram of a configuration for real-time image transmission/reception of a second electronic device according to an embodiment of the disclosure.

FIG. 6 is a block diagram of a configuration for real-time image transmission/reception of a second electronic device according to an embodiment of the disclosure.

Referring to FIG. 6, a second electronic device 600 may include a camera 640, a communication module 650, and a processor 610. For example, the second electronic device 600 may be an augmented reality (AR) device (e.g., the AR device 220 of FIG. 2 or the AR device 300 of FIG. 3), but is not limited thereto, and may be other types of devices having a camera and a short-range wireless communication function.

Hereinafter, an operation of each configuration of the processor 610 for, when a first electronic device 690 (e.g., the electronic device 210 of FIG. 2, the electronic device 400 of FIG. 4, or the first electronic device 500 of FIG. 5) transmits or receives an image to or from a counterpart device (e.g., the counterpart device 230 of FIG. 2), acquiring image data through the camera 640 of the second electronic device 600 and transmitting the image data to the first electronic device 690 will be described in detail.

Referring to FIG. 6, the processor 610 may include an image acquisition unit 662, an encoder 664, a packetizer 666, a camera change process determination unit 676, a battery capacity detection unit 680, a detachment detection unit 682, and a camera framework 668, and a part of the configurations shown in some embodiments may be omitted or substituted. Each illustrated configuration of the processor 610 may be a software module which can be executed in the processor 610, and may be, for example, an application, a framework, or a driver. According to an embodiment, a part (e.g., the encoder 664 and the packetizer 666) of the illustrated configurations may be configured as a separate hardware module.

According to various embodiments, the image acquisition unit 662 may receive the captured image data from the camera 640 in real time. The image data acquired by the image acquisition unit 662 may be transmitted to the encoder 664, and the encoder 664 may encode the image data. According to an embodiment, the encoder 664 may transmit the encoded bit stream to the camera change process determination unit 676, and the image data may be transmitted to the first electronic device 690 through the communication module 650 in the form of a bit stream. According to another embodiment, the encoder 664 may transmit the encoded bit stream to the packetizer 666, and the image data which is RTP-packetized by the packetizer 666 may be transmitted to the first electronic device 690 through the communication module 650.

According to various embodiments, the battery capacity detection unit 680 may detect the capacity of a battery of the second electronic device 600 in real time. According to an embodiment, the battery capacity detection unit 680 may transmit a low battery event to the camera change process determination unit 676 when the capacity of the battery is lowered to a reference value or less. According to another embodiment, the battery capacity detection unit 680 may transmit capacity information of the battery to the camera change process determination unit 676 in real time.

According to various embodiments, the detachment detection unit 682 may detect whether the second electronic device 600 is mounted on or removed from a user's body. For example, the second electronic device 600 is a wearable device (e.g., an AR device) which can be worn on the user's body, and the detachment detection unit 682 may detect whether the device is detached, based on sensor data of a sensor configured to detect whether the device is in contact with the body.

According to various embodiments, the camera change process determination unit 676 may transmit event information received from the battery capacity detection unit 680 and/or the detachment detection unit 682 to the first electronic device 690 through the communication module 650. The first electronic device 690 may transmit, to the second electronic device 600, change information indicating that an image source is changed from the camera 640 of the second electronic device 600 to a camera of the first electronic device 690 or vice versa when an image source change event occurs. According to the received change information, the camera change process determination unit 676 may perform an operation for generating image data by using the camera 640 of the second electronic device 600 or an operation for stopping generation (or transmission) of image data.

According to various embodiments, when the image source is changed to the camera 640 of the second electronic device 600, the camera change process determination unit 676 may transmit the image source to the camera framework 668, and the camera framework 668 may generate image data by driving the camera 640 according to the received information.

Figure 7:
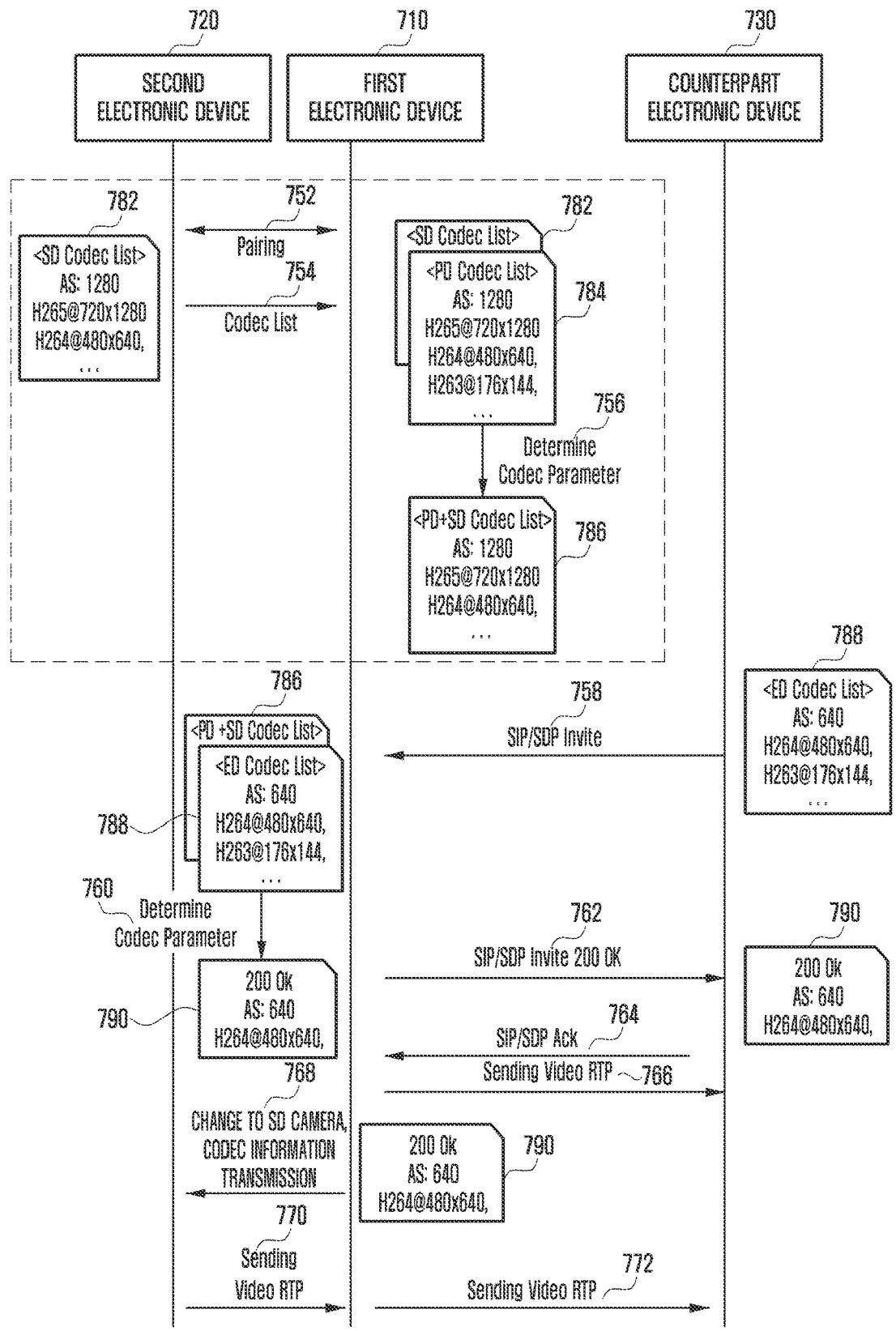
FIG. 7 illustrates an image format configuration and negotiation method in a real-time image transmission/reception system according to an embodiment of the disclosure.

FIG. 7 illustrates an image format configuration and negotiation method in a real-time image transmission/reception system according to an embodiment of the disclosure.

According to various embodiments, a first electronic device 710 may use a real-time transport protocol (RTP) during image transmission/reception (e.g., IMS video call) with a counterpart device 730. When the first electronic device 710 initiates a video call with the counterpart device 730, the first electronic device may exchange an image format supported by each device by using a session description protocol (SDP) message included in a session initiation protocol (SIP) message, and negotiate an image format to be used during image transmission/reception.

According to various embodiments, the first electronic device 710 may negotiate an image format to be used during image data transmission/reception by using an image format which can be supported by both the first electronic device 710 and a second electronic device 720.

According to various embodiments, in operation 752, the first electronic device 710 and the second electronic device 720 may establish a short-range wireless communication connection (or pairing). The short-range wireless communication connection may be Wi-Fi or Bluetooth, but is not limited thereto.

According to various embodiments, in operation 754, the second electronic device 720 may transmit first image format information 782 which can be supported by the second electronic device 720 to the first electronic device 710. The image format information may include at least one of an RTP payload type, a video codec, a maximum bit rate, and a resolution. For example, the second electronic device 720 can support AS:1280, H.265 @ 720*1280, and H.264 @ 480*640, and may transmit the first image format information 782 including information on a corresponding video codec to the first electronic device 710.

According to various embodiments, in operation 756, the first electronic device 710 may generate third image format information 786 including image formats which can be supported by both the first electronic device 710 and the second electronic device 720, based on the first image format information 782 received from the second electronic device 720 and second image format information 784 which can be supported by the first electronic device 710. For example, the first electronic device 710 can support AS:1280, H.265 @ 720*1280, H.264 @ 480*640, and H.263 @ 176*144, and the first electronic device 710 may generate the third image format information 786 including S:1280, H.265 @ 720*1280, and H.264 @ 480*640 as a video codec which can be supported by both the first electronic device 710 and the second electronic device 720.

According to various embodiments, in operation 758, the first electronic device 710 may receive an invite message for a video call connection from the counterpart device 730. The invite message may include an SIP and SDP message, and the SDP message may include image format information 788 which can be supported by the counterpart device 730.

According to various embodiments, in operation 760, the first electronic device 710 may determine an image format 790 which can be supported by all the first electronic device 710, the second electronic device 720, and the counterpart device 730, based on the previously determined third image format information 786 and the image format information 788 received from the counterpart device 730. For example, the first electronic device 710 may determine AS:640 and H.264 @ 480*640 as a video codec which can be supported by all the first electronic device, the second electronic device, and the counterpart device.

According to various embodiments, in operation 762, the first electronic device 710 may transmit, to the counterpart device 730, a response message (e.g., 200 OK) including image format information 790 determined in response to the SIP and SDP invite message of the counterpart device 730.

According to various embodiments, in operation 764, the counterpart device 730 may transmit an ACK for the response message to the first electronic device 710, and accordingly, the negotiation of the image format may be completed.

According to various embodiments, in operation 766, the first electronic device 710 may process image data acquired from a camera according to the image format 790 determined in the negotiation process, and transmit the image data to the counterpart device 730 in the form of an RTP stream.

According to various embodiments, in operation 768, when an image source change event occurs, the first electronic device 710 may transmit event information to the second electronic device 720. According to an embodiment, when the image source change event occurs, the first electronic device 710 may transmit the image format information 790 determined in the SIP and SDP negotiation process with the counterpart device 730.

According to various embodiments, in operation 770, the second electronic device 720 may process the image data acquired from the camera as an RTP packet and transmit the RTP packet to the first electronic device 710. In this case, the second electronic device 720 may process the image data according to the image format information received from the first electronic device 710.

According to various embodiments, in operation 772, the first electronic device 710 may transmit the RTP stream received from the second electronic device 720 to the counterpart device 730 via a network.

Figure 8:
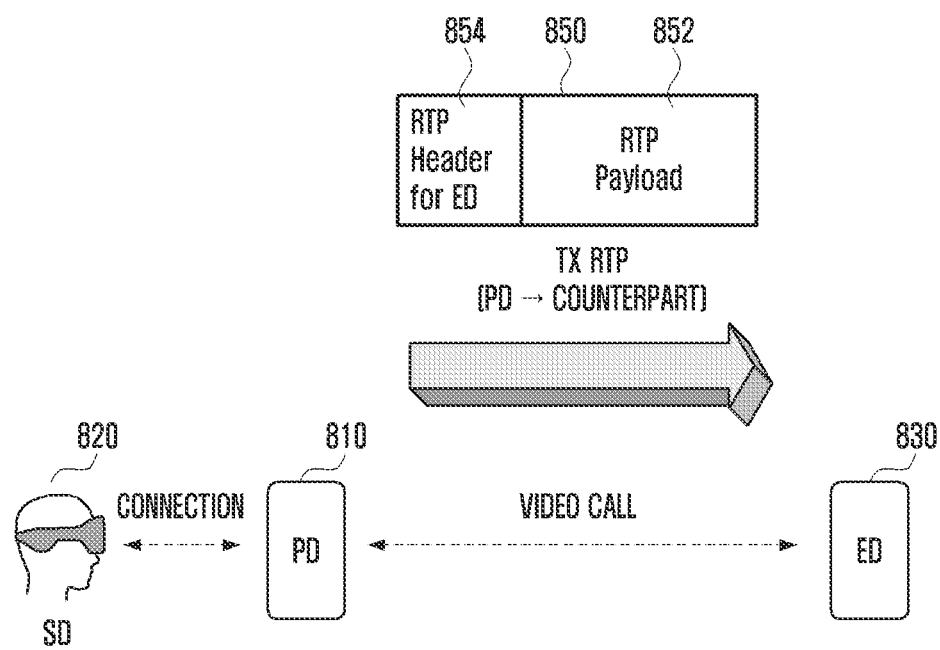
FIG. 8 illustrates a method for transmitting an image acquired by a first electronic device to a counterpart device according to an embodiment of the disclosure.

FIG. 8 illustrates a method for transmitting an image acquired by a first electronic device 810, which is in communication with a second electronic device 820, to a counterpart device 830 according to an embodiment of the disclosure.

According to various embodiments, during a video call with a counterpart device (ED) 830, a first electronic device (PD) 810 may transmit an RTP packet 850 including image data acquired by a camera of the first electronic device 810 to the counterpart device.

Referring to FIG. 8, an RTP payload 852 may include image data (or encoded image data) acquired by the camera. The first electronic device 810 may encode and RTP-packetize the image data, based on image format information determined in a process of an SIP/SDP negotiation with the counterpart device 830, and generate an RTP header 854.

Figure 9A:
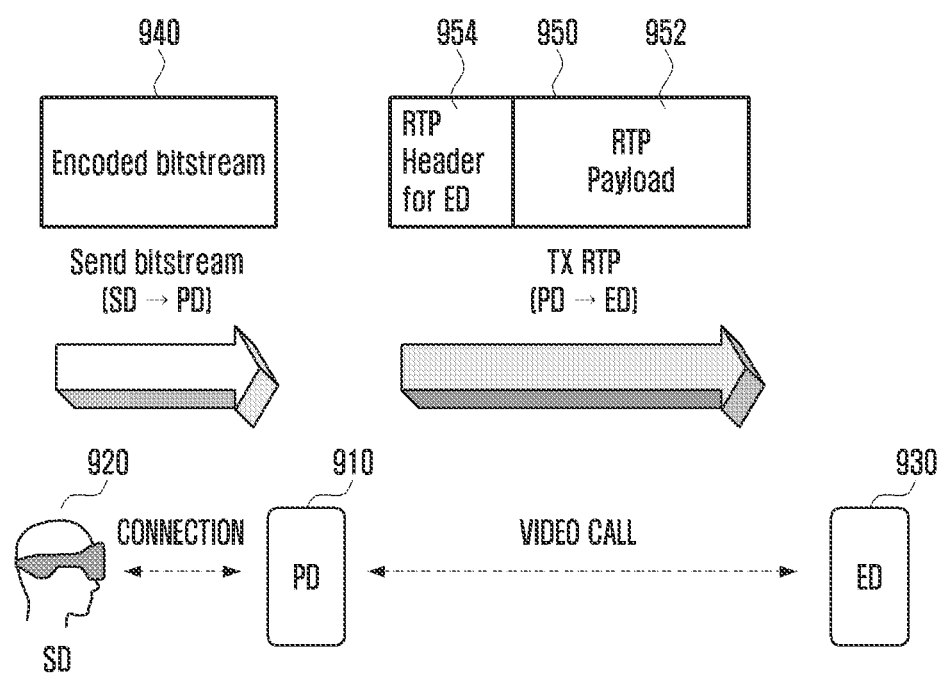
FIG. 9A illustrates a method for transmitting an image acquired by a second electronic device to a counterpart device according to various embodiments of the disclosure.
Figure 9B:
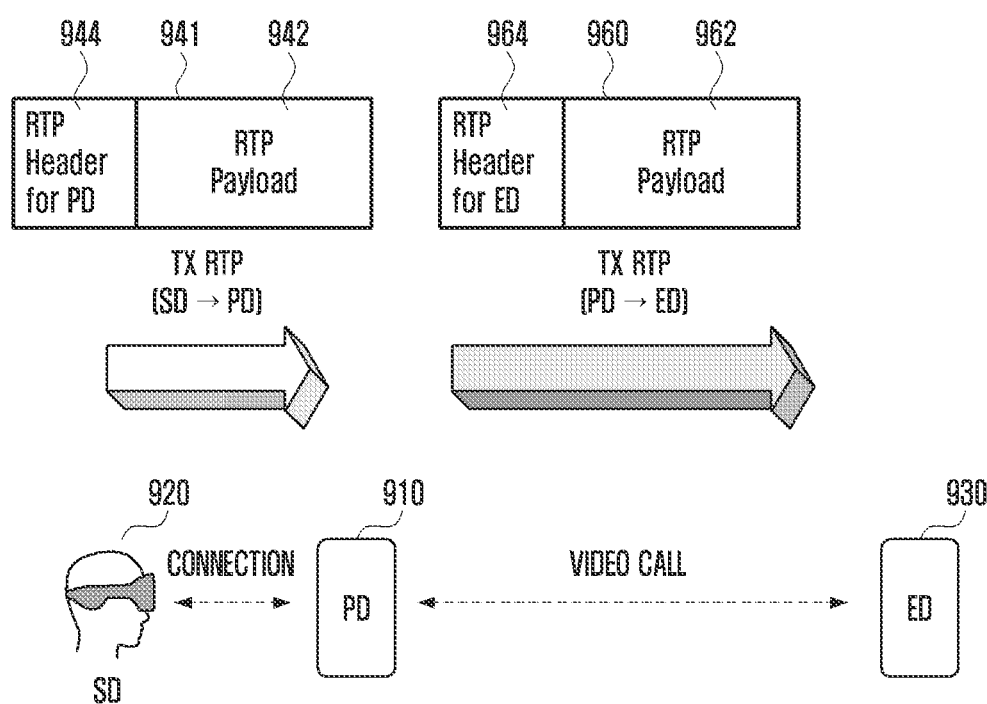
FIG. 9B illustrates a method for transmitting an image acquired by a second electronic device to a counterpart device according to various embodiments of the disclosure.

FIGS. 9A and 9B illustrate a method for transmitting an image acquired by a second electronic device to a counterpart device according to various embodiments of the disclosure.

FIGS. 9A and 9B illustrate an embodiment in which a first electronic device PD receives image data of a camera of a second electronic device SD and transmits the image data to a counterpart device ED according to an image source change event, and FIG. 9A illustrates a bit stream relay scheme and FIG. 9B illustrates an RTP relay scheme.

Referring to FIG. 9A, the second electronic device 920 may transmit image data of the camera of the second electronic device 920 to the first electronic device 910 as encoded bit stream data 940. For example, the second electronic device 920 may encode the image data of the camera by using image format information (e.g., third image format information) received from the first electronic device 910, and then transmit the encoded video bit stream 940 to the first electronic device 910.

The first electronic device 910 may RTP-packetize the received bit stream 940 by using codec information determined in an SIP/SDP message exchange process with a counterpart device 930, and then transmit the packetized bit stream to the counterpart device 930 via a network. In an embodiment of the disclosure, since the first electronic device 910 continues to perform RTP packetizing even when an image source is changed, the first electronic device may perform transmission while maintaining main information such as an SSRC, a timestamp, and a sequence number of an RTP header 954 of an RTP packet 950 with an RTP payload 952, and accordingly, the counterpart device 930 (or a network server) may perform recognition as a single continuous RTP stream.

Referring to FIG. 9B, the second electronic device 920 may RTP-packetize image data acquired by the camera of the second electronic device 920, and transmit the packetized image data to the first electronic device 910. For example, the second electronic device 920 may encode image data by using video codec information received from the first electronic device 910, and then RTP-packetize the image data. The second electronic device 920 may include the encoded image data in an RTP payload 942 and include an RTP header 944 for transmission to the first electronic device 910 so as to generate an RTP packet 941.

In this case, the second electronic device 920 may include, in the RTP header 944, predetermined RTP information which can be transmitted to the first electronic device 910, instead of completely the same information as RTP information transmitted by the first electronic device 910 to the counterpart device 930.

According to various embodiments, the first electronic device 910 may change the RTP header 944 in the RTP packet 941 received from the second electronic device 920 into an RTP header 964 of an RTP packet 960 with an RTP payload 962 required for transmission to the counterpart device 930. As described above, the second electronic device 920 may include, in the RTP header 944, predetermined RTP information which can be transmitted to the first electronic device 910, and the first electronic device 910 may change to the RTP header 964 suitable for a video call session with the counterpart device 930 and then transmit the RTP header to the counterpart device 930 via the network.

As such, in a case where image data acquired by a camera of the first electronic device 910 and image data acquired by the camera of the second electronic device 920 are transmitted, if two or more RTP streams are simply changed and transmitted to the counterpart device 930 even when the same video codec is used, there is a risk that the counterpart device 930 or a server device on the network may recognize the RTP streams as a different RTP stream or as packet loss. Therefore, it is necessary to seamlessly change an RTP even when an image source is changed from the camera of the first electronic device 910 to the camera of the second electronic device 920 such that the counterpart device 930 recognizes that there is no change in the image source, so as to recognize the stream as having no packet loss. To this end, it is necessary to change and transmit RTP header information such that the same is connected naturally with the previous RTP information.

According to various embodiments, the first electronic device 910 may configure a synchronization source (SSRC) ID and a payload type in header information of a second RTP packet received from the second electronic device 920 to be the same as those in header information of a first RTP packet transmitted from the first electronic device 910 to the counterpart device 930, consecutively configure a sequence number, and configure a timestamp at a predetermined interval.

Figure 10A:
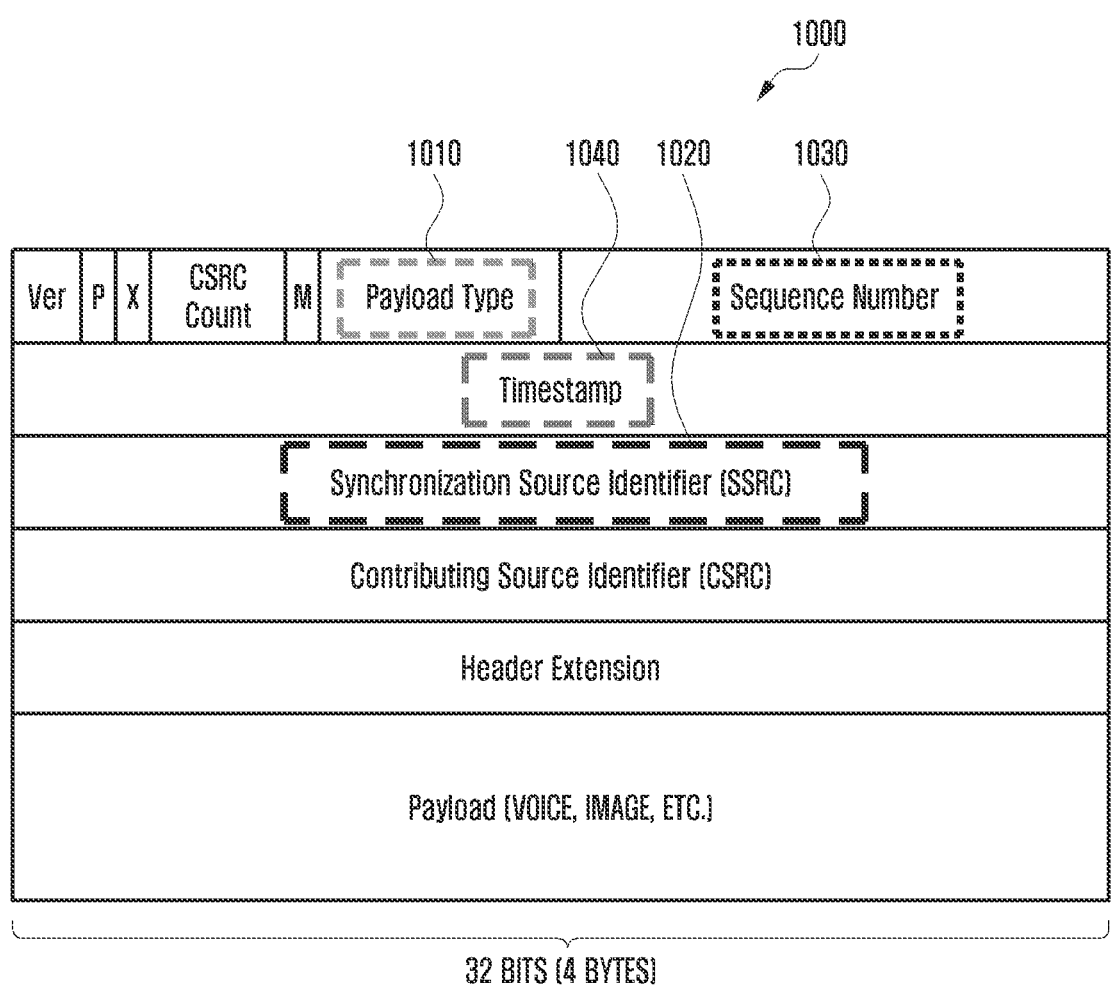
FIG. 10A illustrates an RTP message when a first electronic device relays an image of a second electronic device to a counterpart device, according to various embodiments of the disclosure.
Figure 10B:
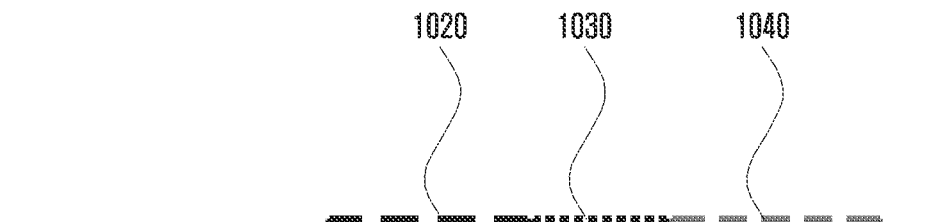
FIG. 10B illustrates an RTP message when a first electronic device relays an image of a second electronic device to a counterpart device, according to various embodiments of the disclosure.

FIGS. 10A and 10B illustrate an RTP message when a first electronic device relays an image of a second electronic device to a counterpart device, according to various embodiments of the disclosure.

Referring to FIG. 10A, RTP header 1000 may include a control bit (e.g., version (ver), padding (p), extension (x), CRSC count (CC), marker (M)), a payload type 1010, a timestamp 1040, a synchronization source (SSRC) ID 1020, a contributing source (CSRC) ID, and header extension.

The payload type 1010 may include values mapped according to a video codec type. A sequence number 1030 is a value for detecting packet loss and reconfiguring the sequence, and the sequence number 1030 of the first transmitted RTP packet may be randomly determined and subsequent RTP packets may be configured to have values which increase by 1. The timestamp may have a predetermined interval for each RTP packet with reference to a sampling interval determined according to the payload type 1010. The SSRC ID 1020 may be a unique number which classifies a source in an RTP session.

According to various embodiments, it is necessary for a first electronic device to appropriately change RTP header information of an RTP packet received from a second electronic device when an image source is changed to a camera of the second electronic device such that a counterpart device recognizes that there is no change in the image source, so as to recognize the stream as having no packet loss.

According to an embodiment, the first electronic device may configure the SSRC ID 1020 and the payload type 1010 in header information of a second RTP packet received by the second electronic device to be the same as those in header information of a first RTP packet transmitted from the first electronic device to the counterpart device. For example, the payload type 1010 is determined according to a video codec type, and since the first electronic device and the second electronic device use a codec determined in a video call session negotiation process with the counterpart device, the same payload type 1010 may be maintained. Since the SSRC ID 1020 is a unique ID of a video call session, if a change occurs during a call, the SSRC ID may be recognized as another call session and thus the session may be dropped from a network server or the counterpart device. Accordingly, the first electronic device may configure the same SSRC ID 1020 and transmit the same.

According to an embodiment, the first electronic device may change the sequence number 1030 and the timestamp 1040 in the header information of the second RTP packet received from the second electronic device to be continuous with the first RTP packet. If the difference between values of the timestamp 1040 and the sequence number 1030 is large or the values are not continuous, the counterpart device or network server may perform recognition as packet loss, and thus the sequence number 1030 may be changed to a value obtained by sequentially adding 1 with respect to each RTP packet, and the timestamp 1040 may be changed to have the same interval with respect to each RTP packet.

Figure 11A:
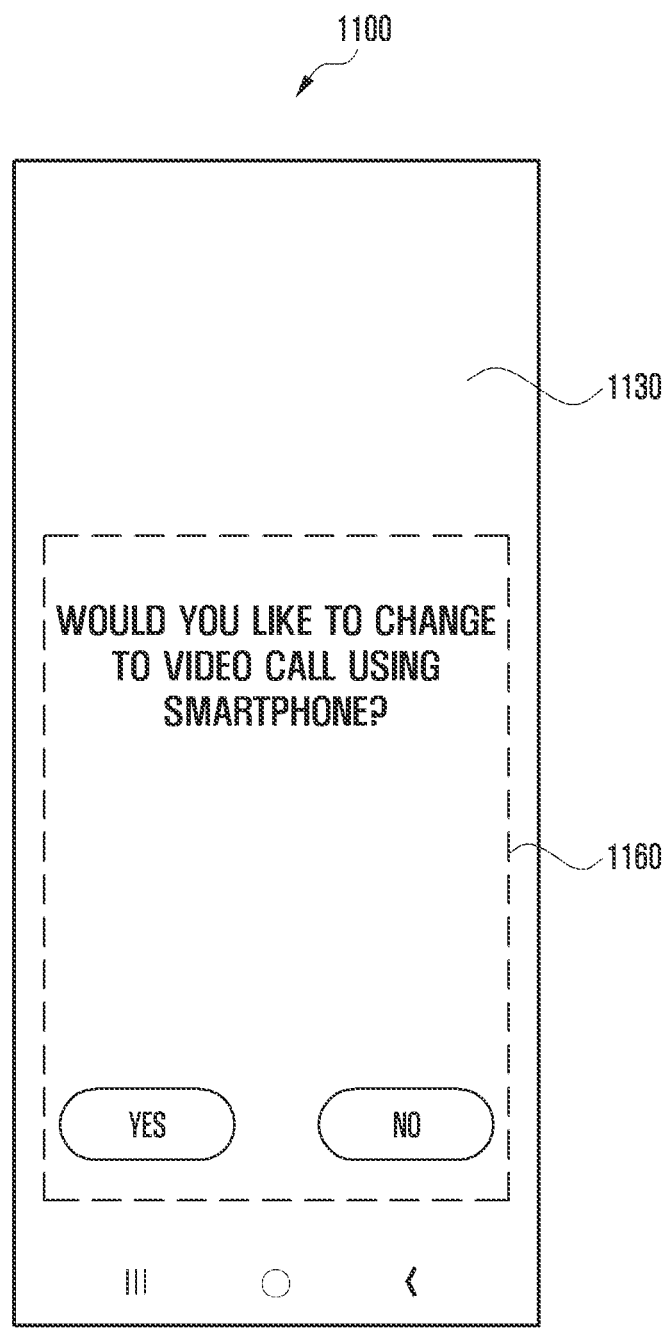
FIG. 11A illustrates a user interface for switching an image source in a first electronic device according to various embodiments of the disclosure.
Figure 11B:
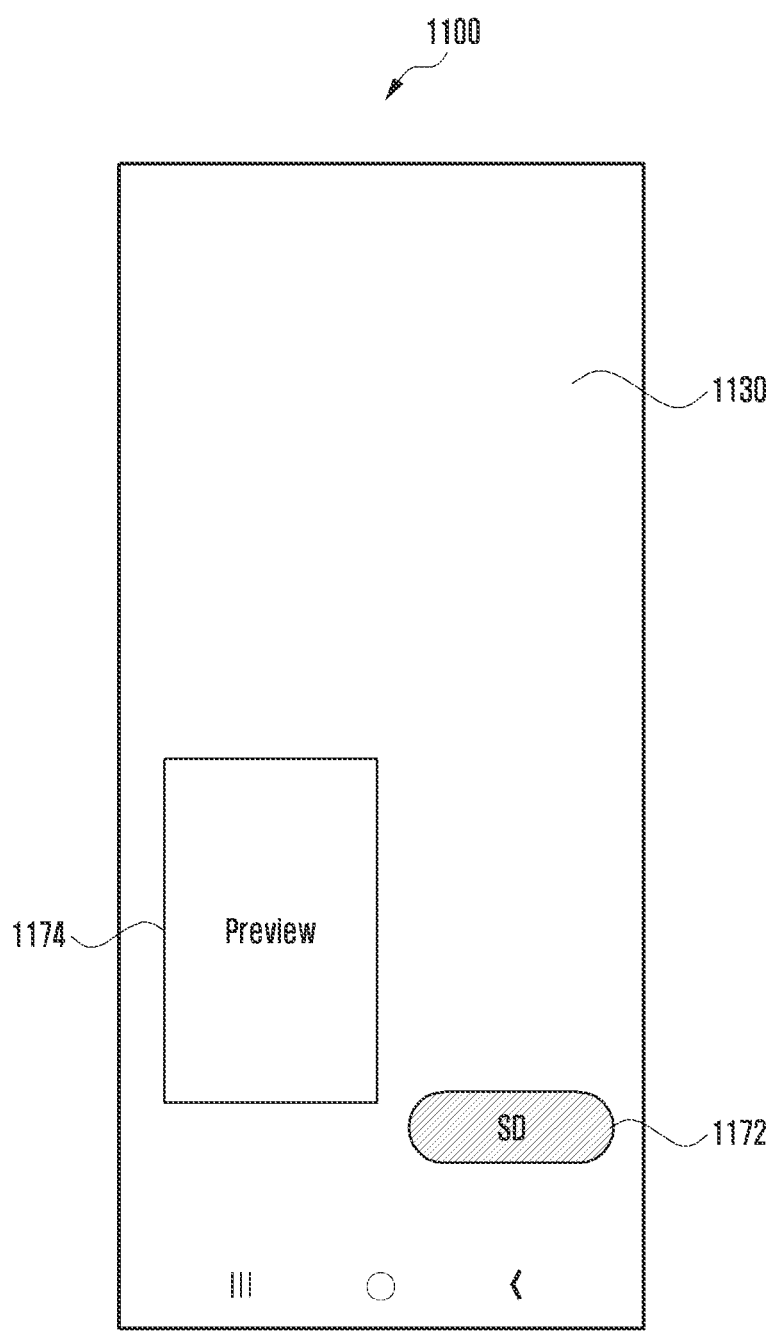
FIG. 11B illustrates a user interface for switching an image source in a first electronic device according to various embodiments of the disclosure.

FIGS. 11A and 11B illustrate a user interface for switching an image source in a first electronic device according to various embodiments of the disclosure.

According to various embodiments, when a predetermined event is detected while a first electronic device 1100 receives image data of a camera of a second electronic device and transmits the image data to a counterpart device, the first electronic device may change image data to be transmitted to the counterpart device into image data acquired from a camera of the first electronic device 1100.

According to an embodiment, the first electronic device 1100 may change an image source according to a user selection through a GUI.

FIG. 11A illustrates a GUI 1160 displayed on a display 1130 of the first electronic device 1100 in a situation in which an image of the camera of the second electronic device is relayed and transmitted. The first electronic device 1100 may change an image source to the camera of the first electronic device 1100 according to a user input on the GUI 1160.

FIG. 11B illustrates a GUI 1172 displayed on a display 1130 of the second electronic device in a situation in which an image of the camera of the first electronic device 1100 is relayed and transmitted. The first electronic device 1100 may display a preview 1174 of an image captured by the camera of the second electronic device on the GUI 1172. The first electronic device 1100 may change an image source to the camera of the second electronic device according to a user input on the GUI 1172.

According to another embodiment, the first electronic device 1100 may automatically change an image source when a predetermined event occurs, without a user's direct input.

Figure 12A:
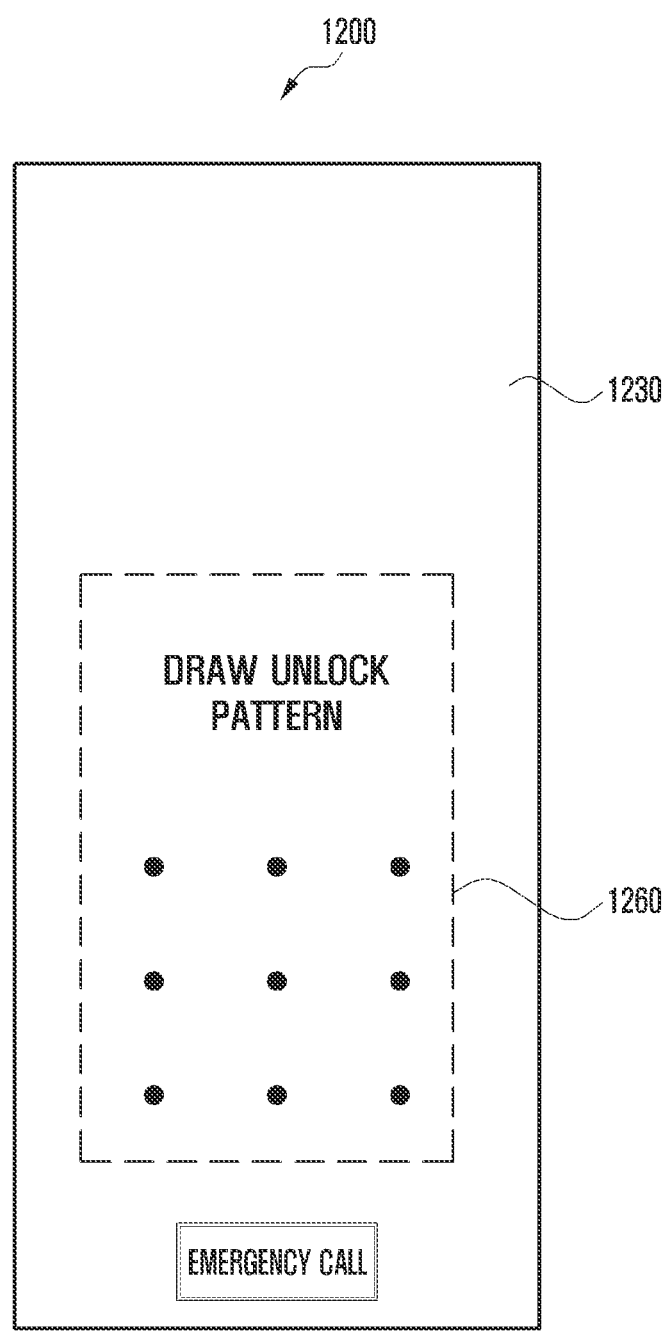
FIG. 12A illustrates a security screen according to various embodiments of the disclosure.
Figure 12B:
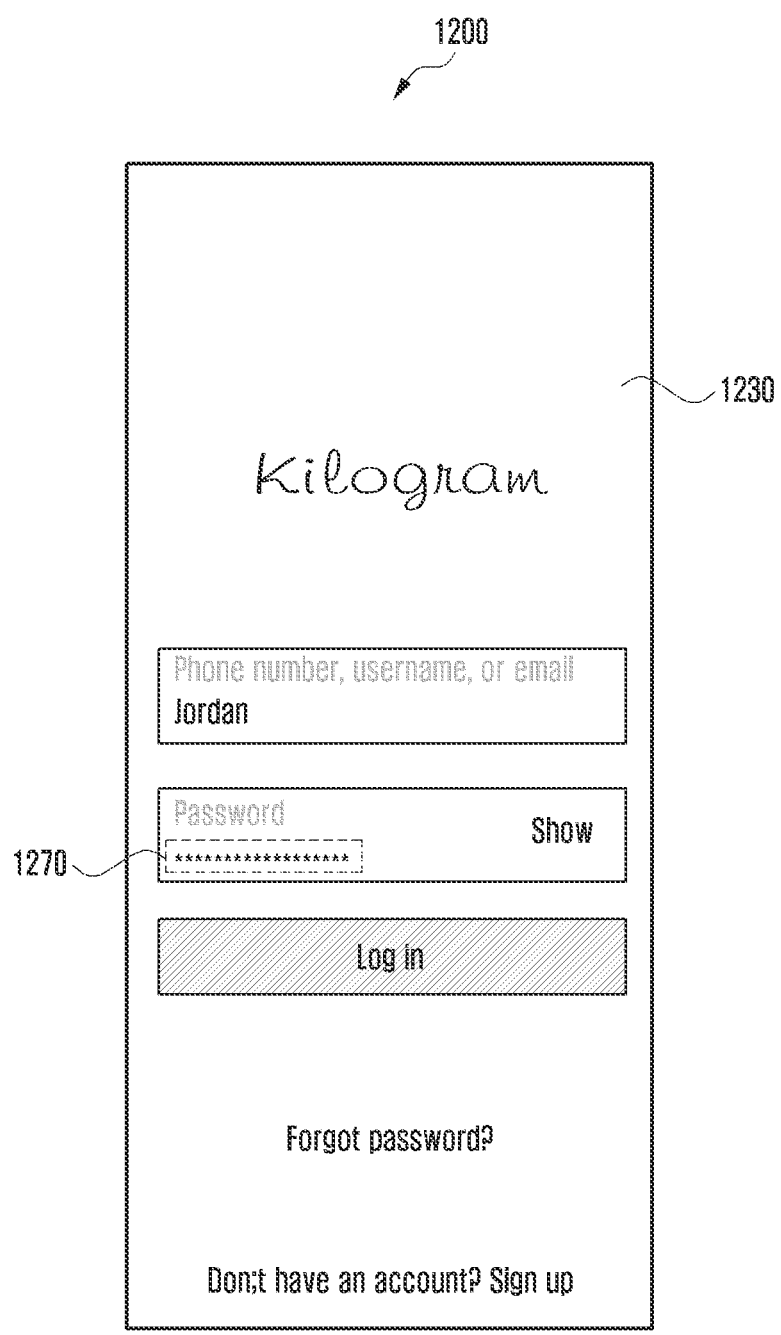
FIG. 12B illustrates a security screen according to various embodiments of the disclosure.

FIGS. 12A and 12B illustrate a security screen according to various embodiments of the disclosure.

According to various embodiments, when a screen to be displayed on a display 1230 of a first electronic device 1200 is a screen of a predetermined type or includes a predetermined character, the first electronic device 1200 may determine that the image source change event has occurred.

When a user operates the first electronic device 1200 while performing real-time image transmission to a camera of an external device (e.g., an AR device), since the user is wearing the external device on the user's face, the user's field of view and a viewing direction of the camera of the external device may be the same. In this case, when a login or unlock screen such as a password, PIN, or pattern is displayed on the display 1230 of the electronic device, an image of the screen may be captured by the camera of the external device and transmitted to a counterpart device. To prevent this, when a screen to be displayed on the display includes a security screen, the first electronic device 1200 may detect the security screen and temporarily change an image source to a camera of a second electronic device, and accordingly, the security screen may not be transmitted to the counterpart device.

According to an embodiment, the first electronic device 1200 may detect that a security-related application is executed or that a security screen is rendered on a foreground surface.

According to an embodiment, when a security screen is displayed on the display 1230, the first electronic device 1200 may change an image source to a camera of the first electronic device 1200. Referring to FIG. 12A, when a security screen including an unlock pattern 1260 is displayed, the first electronic device 1200 may determine as an image source change event. For example, if a key guard which provides a security screen is operated, a key guard state is changed, and in another process, a state update-related message is received, so that whether a key guard screen is displayed can be identified.

In the case of a manner (e.g., iris recognition or fingerprint recognition) of using biometric information authentication in an unlock screen, a security problem does not occur even when the screen is captured and transmitted to another person, and thus the first electronic device 1200 may not perform change of an image source.

According to an embodiment, when a plurality of character patterns 1270 or a character used when entering a password, such as "*", is displayed on the display 1230, or a character related to input of security information such as password input is displayed, the processor may change an image source to the camera of the first electronic device 1200.

In an application or a web browser, an ID or password may be input into a device, mostly by input via a keyboard. For example, a user may input text through an input method editor (IME), and, in each text window, the shape of an input key may be configured according to the input type. In particular, in the case of an input window requiring security, such as a password, a keyboard including a password-related attribute may be activated, and an input value may be displayed as a specific character (e.g., *) as shown in FIG. 12B. In this case, in order to prevent an image including a password from being transmitted to the counterpart device, when a keyboard for inputting a password is executed in an input window having an attribute value of a password, a corresponding event may be received by another module of the first electronic device 1200 and an image source may be implemented to be changed to the camera of the second electronic device.

According to another embodiment, when a security event occurs, the first electronic device 1200 may pause image transmission to the counterpart device without a change of an image source.

Figure 13:
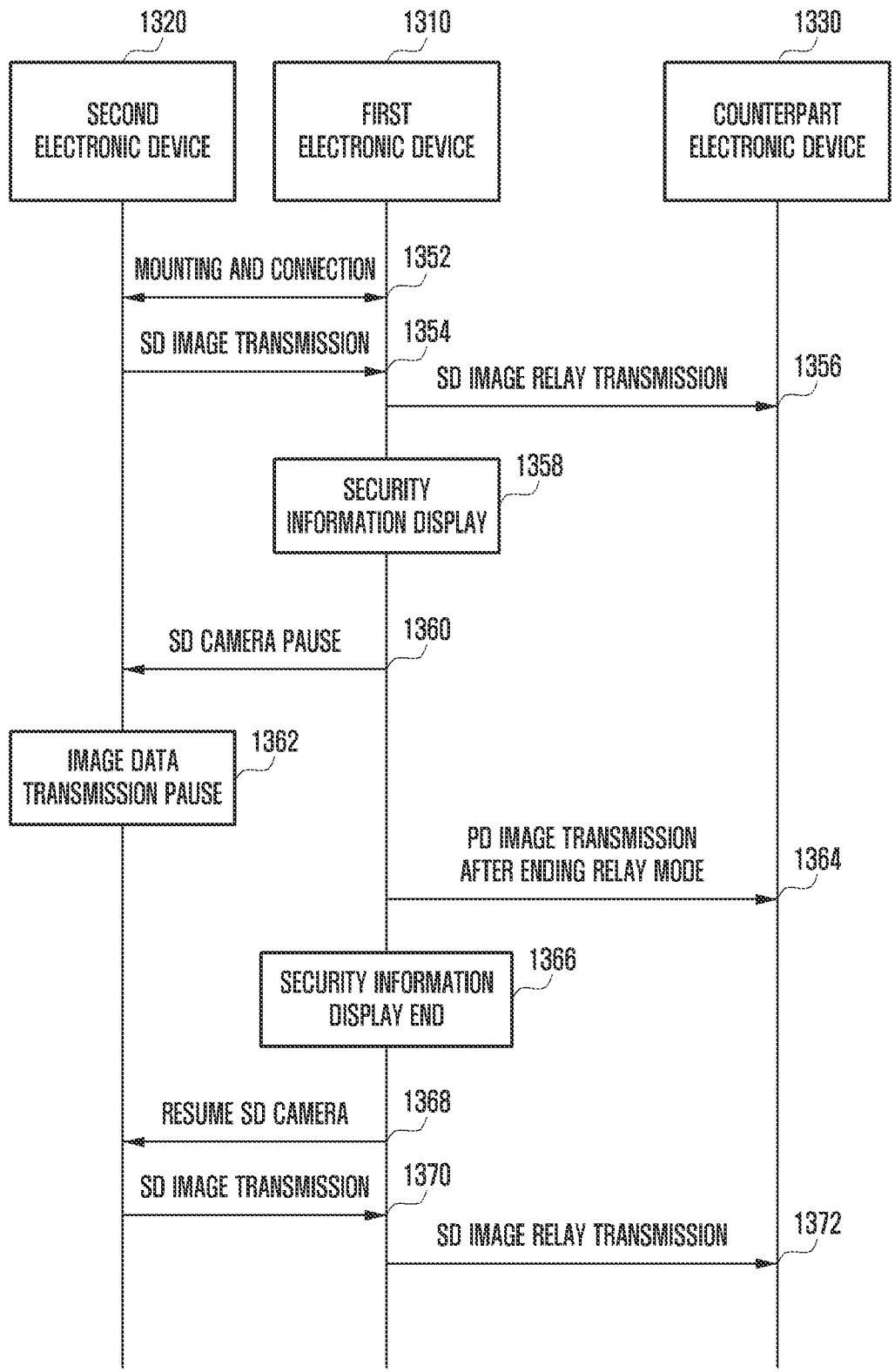
FIG. 13 illustrates a method for switching an image source according to a security screen event according to an embodiment of the disclosure.

FIG. 13 illustrates a method for switching an image source according to a security screen event according to an embodiment of the disclosure.

According to various embodiments, in operation 1352, a first electronic device 1310 (e.g., the electronic device 210 of FIG. 2, the electronic device 400 of FIG. 4, or the first electronic device 500 of FIG. 5) may establish a short-range wireless communication connection (e.g., Wi-Fi) with a second electronic device 1320 (e.g., the AR device 220 of FIG. 2 or the second electronic device 600 of FIG. 6) in a state where a user wears the second electronic device 1320. Thereafter, the first electronic device 1310 may initiate a video call with a counterpart device 1330 according to a user's request of the first electronic device 1310 or receive a video call request from the counterpart device 1330.

According to various embodiments, in operation 1354, the second electronic device 1320 may transmit image data acquired by a camera of the second electronic device 1320 to the first electronic device 1310. For example, when an image transmission/reception function with the counterpart device 1330 is initiated in a state in which a short-range wireless communication connection is established, the first electronic device 1310 may select the camera of the second electronic device 1320 by default, and the camera of the second electronic device 1320 may be selected according to a user selection on a GUI.

According to various embodiments, in operation 1356, the first electronic device 1310 may transmit the image data received from the second electronic device 1320 to the counterpart device 1330. For example, when an RTP packet is transmitted from the second electronic device 1320 (e.g., the RTP relay scheme of FIG. 9B), based on header information of an RTP packet (e.g., an RTP packet) when image data (e.g., first image data) of a camera of the first electronic device 1310 is transmitted to the counterpart device 1330, the header information of the RTP packet received from the second electronic device 1320 may be changed and transmitted to the counterpart device 1330. According to another embodiment, when a bit stream is transmitted from the second electronic device 1320 (e.g., the bit stream relay scheme of FIG. 9A), the first electronic device 1310 may RTP-packetize the bit stream to transmit the same to the counterpart device 1330.

According to various embodiments, in operation 1358, the first electronic device 1310 may detect the display of security information on a display. For example, the security information may include an unlock pattern (or key guard) of FIG. 12A and a password input screen of FIG. 12B.

According to various embodiments, in operation 1360, the first electronic device 1310 may detect an image source change event according to the display of the security information, and request the second electronic device 1320 to stop transmitting image data. In operation 1362, the second electronic device 1320 may pause image data transmission. According to another embodiment, in a situation in which image data of the second electronic device 1320 is continuously transmitted, the first electronic device 1310 may drop the image data and transmit image data of the camera of the electronic device to the counterpart device 1330.

According to various embodiments, in operation 1364, the first electronic device 1310 may end a relay mode of image data and transmit the image data acquired by the camera of the first electronic device 1310 to the counterpart electronic device.

According to various embodiments, in operation 1366, the first electronic device 1310 may detect the end of the security information display. In operation 1368, the first electronic device 1310 may request the second electronic device 1320 to resume image data transmission, and in operation 1370, the second electronic device 1320 may transmit image data acquired by the camera to the first electronic device 1310 in the same scheme as the previously used scheme for transmission (e.g., operation 1354). In operation 1372, the first electronic device 1310 may transmit the image data received from the second electronic device 1320 to the counterpart device 1330.

Figure 14:
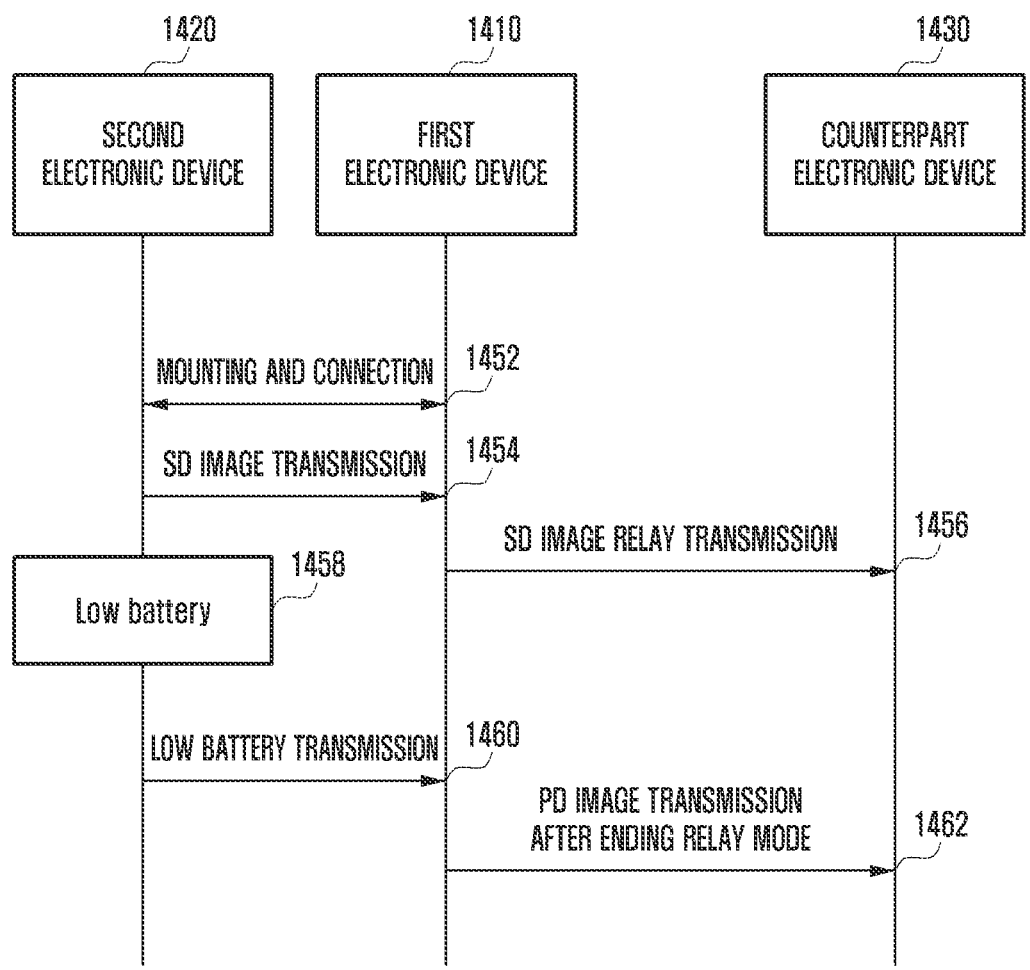
FIG. 14 illustrates a method for switching an image source according to a battery event according to an embodiment of the disclosure.

FIG. 14 illustrates a method for switching an image source according to a battery event according to an embodiment of the disclosure.

According to various embodiments, when the battery capacity of a second electronic device 1420 is less than or equal to a reference value, a first electronic device 1410 may determine that an image source change event has occurred.

According to various embodiments, in operation 1452, the first electronic device 1410 (e.g., the electronic device 210 of FIG. 2, the electronic device 400 of FIG. 4, or the first electronic device 500 of FIG. 5) may establish a short-range wireless communication connection with the second electronic device 1420 (e.g., the AR device 220 of FIG. 2 or the second electronic device 600 of FIG. 6) in a state where a user wears the second electronic device 1420. Thereafter, the first electronic device 1410 may initiate a video call with a counterpart device 1430 according to a user's request of the first electronic device 1410 or receive a video call request from the counterpart device 1430.

According to various embodiments, in operation 1454, the second electronic device 1420 may transmit image data acquired by a camera of the second electronic device 1420 to the first electronic device 1410, and in operation 1456, the first electronic device 1410 may transmit the image data received from the second electronic device 1420 to the counterpart device 1430.

According to various embodiments, in operation 1458, the second electronic device 1420 may detect a low battery event. For example, the second electronic device 1420 may identify whether the remaining capacity of a battery is lowered to a reference value or less. In operation 1460, the second electronic device 1420 may transmit the low battery event to the first electronic device 1410. According to another embodiment, the first electronic device 1410 may periodically receive state information of the second electronic device 1420 including battery capacity information while connected to the second electronic device 1420 via short-range wireless communication, and when the battery capacity is lowered to the reference value or less, the first electronic device 1410 may determine that the low battery event occurs.

According to various embodiments, in operation 1462, the first electronic device 1410 may end a relay mode of image data in response to the detection of the low battery event, and transmit image data acquired by a camera of the first electronic device 1410 to the counterpart electronic device. According to an embodiment, the first electronic device 1410 may transmit a request for instructing to stop transmission of image data to the second electronic device 1420 such that the second electronic device 1420 does not transmit the image data, or in a situation in which the image data of the second electronic device 1420 is continuously transmitted, the first electronic device 1410 may drop the image data and transmit image data of the camera of the electronic device to the counterpart device 1430.

Figure 15:
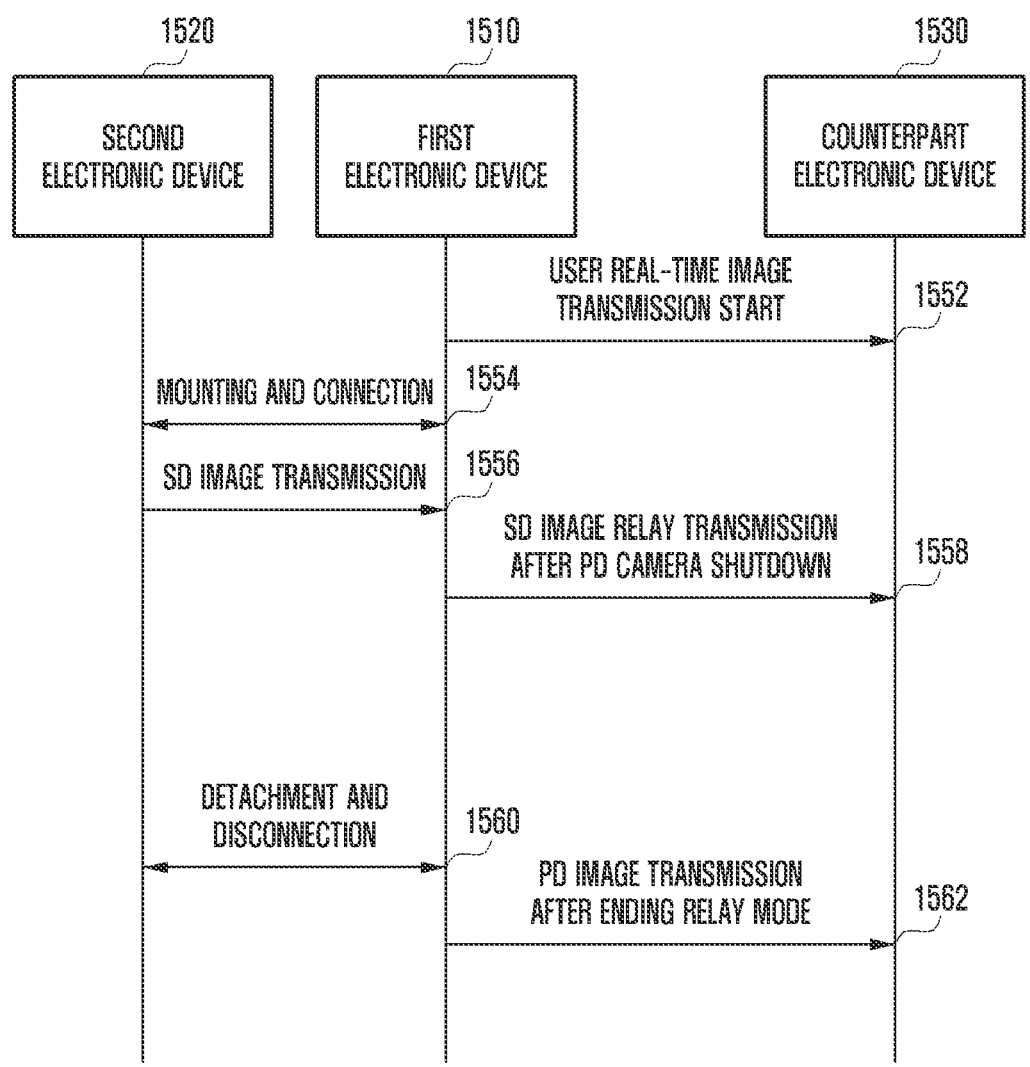
FIG. 15 illustrates a method for switching an image source according to a disconnection event according to an embodiment of the disclosure.

FIG. 15 illustrates a method for switching an image source according to a disconnection event according to an embodiment of the disclosure.

According to various embodiments, when a user releases the wearing of a second electronic device 1520 or a short-range wireless communication connection with the second electronic device 1520 is released, a first electronic device 1510 may determine that an image source change event has occurred.

According to various embodiments, in operation 1552, the first electronic device 1510 (e.g., the electronic device 210 of FIG. 2, the electronic device 400 of FIG. 4, or the first electronic device 500 of FIG. 5) may initiate a video call with a counterpart device 1530 according to a user's request of the first electronic device 1510 or receive a video call request from the counterpart device 1530. Since the first electronic device 1510 does not establish a short-range wireless communication connection with the second electronic device 1520, the first electronic device 1510 may transmit image data acquired by a camera of the first electronic device 1510 to the counterpart device 1530 in real time.

According to various embodiments, in operation 1554, the first electronic device 1510 may establish a short-range wireless communication connection with the second electronic device 1520 (e.g., the AR device 220 of FIG. 2 or the second electronic device 600 of FIG. 6) in a state where a user wears the second electronic device 1520.

According to various embodiments, in operation 1556, the second electronic device 1520 may transmit image data acquired by a camera of the second electronic device 1520 to the first electronic device 1510, and in operation 1558, the first electronic device 1510 may change to an image relay mode, stop transmitting the image data acquired by the camera of the first electronic device 1510, and transmit the image data received from the second electronic device 1520 to the counterpart device 1530.

According to various embodiments, in operation 1560, a user may remove the second electronic device 1520 in a state where the user wears the second electronic device. The second electronic device 1520 may include a sensor configured to determine whether the second electronic device is worn on a user's body, and a sensor signal may be periodically transmitted to the first electronic device 1510 via a short-range wireless communication connection. When the second electronic device 1520 is removed, the first electronic device 1510 and the second electronic device 1520 may release the established short-range wireless communication connection.

According to various embodiments, in operation 1562, the first electronic device 1510 may end the relay mode of the image data and transmit the image data acquired by the camera of the first electronic device 1510 to the counterpart electronic device.

An electronic device according to various embodiments may include a first camera, a communication module, and a processor operatively connected to the first camera and the communication module, wherein the processor is configured to establish a short-range wireless communication connection with an external device including a second camera, by using the communication module, establish a connection for image transmission/reception with a counterpart device, determine a format of image data to be transmitted to the counterpart device, select one of the first camera of the electronic device and the second camera of the external device to acquire an image to be transmitted to the counterpart device, when the first camera is selected, packetize first image data acquired from the first camera according to the determined format, so as to transmit the packetized first image data to the counterpart device through the communication module, and when the second camera is selected, receive second image data from the external device, and packetize the second image data according to the determined format, so as to transmit the packetized second image data to the counterpart device through the communication module.

According to various embodiments, the processor may be configured to receive first image format information supported by the external device from the external device through the communication module, identify second image format information supported by the electronic device, determine third image format information including an image format supported by both the external device and the electronic device, based on the first image format information and the second image format information, and determine the format of the image data to be transmitted to the counterpart device, based on the third image format information.

According to various embodiments, the third image format information may include at least one of a resolution, a maximum bit rate, and a codec supported by both the external device and the electronic device.

According to various embodiments, the connection for the image transmission/reception with the counterpart device is a real-time transport protocol (RTP) connection, and the processor may be configured to transmit a session description protocol (SDP) message including the third image format information to the counterpart device in the process of establishing the connection for the image transmission/reception with the counterpart device.

According to various embodiments, the processor may be configured to transmit a first RTP packet including the first image data to the counterpart device, and when a second RTP packet including the second image data is received from the external device, change header information of the second RTP packet, based on header information of the first RTP packet.

According to various embodiments, the processor may be configured to configure a synchronization source (SSRC) ID and a payload type in the header information of the second RTP packet to be the same as those in the header information of the first RTP packet, consecutively configure a sequence number, and configure a timestamp at a predetermined interval.

According to various embodiments, the processor may be configured to, while transmitting the second image data to the counterpart device, when a predetermined event is detected, change the image data to be transmitted to the counterpart device into the first image data acquired from the first camera.

According to various embodiments, the processor may be configured to, in response to the event, transmit a request for instructing to stop transmission of the second image data to the external device.

According to various embodiments, the electronic device may further include a display, and the event may occur when a screen to be displayed on the display includes security information.

According to various embodiments, when the screen to be displayed on the display is a screen of a predetermined type or includes a predetermined character, the processor may determine that the event occurs.

According to various embodiments, the processor may be configured to receive battery capacity information of the external device through the communication module, and when a capacity of a battery of the external device is less than or equal to a reference value, determine that the event occurs.

According to various embodiments, the processor may be configured to, when the short-range wireless communication connection with the external device is released, determine that the event occurs.

According to various embodiments, the external device may be artificial reality glasses (AR glasses).

An image data transmission/reception method of an electronic device according to various embodiments may include establishing a short-range wireless communication connection with an external device including a second camera, establishing a connection for image transmission/reception with a counterpart device, determining a format of image data to be transmitted to the counterpart device, selecting one of a first camera of the electronic device and the second camera of the external device to acquire an image to be transmitted to the counterpart device, when the first camera is selected, packetizing first image data acquired from the first camera according to the determined format, so as to transmit the packetized first image data to the counterpart device, and when the second camera is selected, receiving second image data from the external device, and packetizing the second image data according to the determined format, so as to transmit the packetized second image data to the counterpart device.

According to various embodiments, the determining of the format of the image data to be transmitted to the counterpart device may include receiving first image format information supported by the external device from the external device, identifying second image format information supported by the electronic device, determining third image format information including an image format supported by both the external device and the electronic device, based on the first image format information and the second image format information, and determining the format of the image data to be transmitted to the counterpart device, based on the third image format information.

According to various embodiments, the connection for the image transmission/reception with the counterpart device is a real-time transport protocol (RTP) connection, and the method may further include transmitting a session description protocol (SDP) message including the third image format information to the counterpart device in the process of establishing the connection for the image transmission/reception with the counterpart device.

According to various embodiments, the transmitting of the first image data to the counterpart device may include transmitting a first RTP packet including the first image data to the counterpart device, and the packetizing of the second image data may include changing header information of a second RTP packet, based on header information of the first RTP packet.

According to various embodiments, the method may further include, while transmitting the second image data to the counterpart device, when a predetermined event is detected, changing the image data to be transmitted to the counterpart device into the first image data acquired from the first camera.

According to various embodiments, the event may occur when a screen to be displayed on a display of the electronic device includes security information, when the screen to be displayed on the display is a screen of a predetermined type, or when the screen to be displayed on the display includes a predetermined character.

According to various embodiments, the event may occur when a capacity of a battery of the external device is less than or equal to a reference value or when the short-range wireless communication connection with the external device is released.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a first camera;
a first communication circuitry configured to establish a cellular communication connection;
a second communication circuitry configured to establish a short-range communication connection;
at least one processor; and
memory for storing instructions that, when executed by the at least one processor, cause the electronic device to:
establish the short-range communication connection with an external device comprising a second camera using the second communication circuitry,
establish the cellular communication connection with a counterpart device using the first communication circuitry,
determine an image format can be supported by the electronic device, the external device and the counterpart device,
when performing a video call with the counterpart device using the second camera, receive, via the second communication circuitry from the external device, second image data in the determined image format, which is acquired from the second camera of the external device, and transmit, via the first communication circuitry to the counterpart device, the second image data, and
when an event related to camera switching is detected while transmitting the second image data to the counterpart device, transmit, via the first communication circuitry to the counterpart device, first image data in the determined image format, which is acquired from the first camera.

2. The electronic device of claim 1, wherein the memory for storing instructions that, when executed by the at least one processor, cause the electronic device to:
receive first image format supported by the external device from the external device using the second communication circuitry,
identify second image format supported by the electronic device, and
determine third image format supported by both the external device and the electronic device, based on the first image format and the second image format.

3. The electronic device of claim 2, wherein the third image format comprises at least one of a resolution, a maximum bit rate, or a codec supported by both the external device and the electronic device.

4. The electronic device of claim 2, wherein memory for storing instructions that, when executed by the at least one processor, cause the electronic device to:
receive an invite message for the cellular communication connection from the counterpart device using the first communication circuitry,
establish the cellular communication connection with the counterpart device based on the invite message,
identify fourth image format information supported by the counterpart device in the invite message,
determine the image format can be supported by the electronic device, the external device and the counterpart device based on the third image format and the fourth image format.

5. The electronic device of claim 1, wherein the memory for storing instructions that, when executed by the at least one processor, cause the electronic device to:
when the event related to camera switching is detected while transmitting the second image data to the counterpart device, transmit, via the first communication circuitry to the counterpart device, a first real-time transport protocol (RTP) packet including the first image data in the determined image format, when the event related to camera switching is detected while transmitting the first RTP packet to the counterpart device, receive, via the second communication circuitry from the external device, a second RTP packet including the second image data in the determined image format, change header information of the second RTP packet using header information of the first RTP packet, and transmit, via the first communication circuitry to the counterpart device, the changed second RTP packet.

6. The electronic device of claim 5, wherein the memory for storing instructions that, when executed by the at least one processor, cause the electronic device to:

configure a synchronization source (SSRC) ID and a payload type in the header information of the second RTP packet to be the same as those in the header information of the first RTP packet, consecutively configure a sequence number, and configure a timestamp at a predetermined interval.

7. The electronic device of claim 5, wherein the memory for storing instructions that, when executed by the at least one processor, cause the electronic device to:

when the event related to camera switching is detected while transmitting the second image data to the counterpart device, transmit, via the second communication circuitry to the external device, a request for instructing to stop transmission of the second RTP packet.

8. The electronic device of claim 1, further comprising:

a display, wherein the event related to camera switching occurs when a screen to be displayed on the display comprises security information.

9. The electronic device of claim 8, wherein the memory for storing instructions that, when executed by the at least one processor, cause the electronic device to:

determine that the event related to camera switching occurs when the screen to be displayed on the display is a screen of a predetermined type or comprises a predetermined character.

10. The electronic device of claim 1, wherein the memory for storing instructions that, when executed by the at least one processor, cause the electronic device to:

receive battery capacity information of the external device using the second communication circuitry, and when a capacity of a battery of the external device is less than or equal to a reference value, determine that the event related to camera switching occurs.

11. The electronic device of claim 1, wherein the memory for storing instructions that, when executed by the at least one processor, cause the electronic device to:

when the short-range communication connection with the external device is released, determine that the event related to camera switching occurs.

12. The electronic device of claim 1, wherein the external device is artificial reality glasses (AR glasses).

13. An image data transmission/reception method of an electronic device, the method comprising:

establishing a short-range wireless communication connection with an external device comprising a second camera;

establishing a cellular communication connection with a counterpart device;

determining an image format can be supported by the electronic device, the external device and the counterpart device;

when performing a video call with the counterpart device using the second camera, receiving, from the external device, second image data in the determined image format, which is acquired from the second camera of the external device, and transmitting, to the counterpart device, the second image data; and when an event related to camera switching is detected while transmitting the second image data to the counterpart device, transmitting, to the counterpart device, first image data in the determined image format, which is acquired from a first camera of the electronic device.

14. The method of claim 13, wherein the determining of the image format comprises:

receiving first image format supported by the external device from the external device;

identifying second image format supported by the electronic device;

determining third image format supported by both the external device and the electronic device, based on the first image format and the second image format;

identify fourth image format supported by the counterpart device; and determining the image format can be supported by the electronic device, the external device and the counterpart device based on the third image format and the fourth image format.

15. The method of claim 13, wherein the transmitting of the first image data to the counterpart device comprises when the event related to camera switching is detected while transmitting the second image data to the counterpart device, transmitting, to the counterpart device, a first real-time transport protocol (RTP) packet including the first image data in the determined image format.

16. The method of claim 15, further comprising;

when the event related to camera switching is detected while transmitting the first RTP packet to the counterpart device, receiving, from the external device, a second RTP packet including the second image data in the determined image format;

changing header information of the second RTP packet using header information of the first RTP packet; and transmitting, to the counterpart device, the changed second RTP packet.

17. The method of claim 13, wherein the event related to camera switching occurs when a screen to be displayed on a display of the electronic device comprises security information, when the screen to be displayed on the display is a screen of a predetermined type, or when the screen to be displayed on the display comprises a predetermined character.

18. The method of claim 13, wherein the event related to camera switching occurs when a capacity of a battery of the external device is less than or equal to a reference value or when the short-range wireless communication connection with the external device is released.

19. A non-transitory computer-readable storage medium configured to store one or more computer programs including instructions that, when executed by at least one processor, cause the at least one processor to:

establish a short-range wireless communication connection with an external device comprising a second camera;

establish a cellular communication connection with a counterpart device;

determine a image format can be supported by an electronic device, the external device and the counterpart device;

when performing a video call with the counterpart device using the second camera, receive, from the external device, second image data in the determined image format, which is acquired from the second camera of the external device, and transmit, to the counterpart device, the second image data; and when an event related to camera switching is detected while transmitting the second image data to the counterpart device, transmit, to the counterpart device, first image data in the determined image format, which is acquired from a first camera of the electronic device.

20. The non-transitory computer-readable storage medium of claim 19, wherein the one or more computer programs further include instructions that cause the at least one processor to:

when the event related to camera switching is detected while transmitting the second image data to the counterpart device, transmit, to the counterpart device, a first real-time transport protocol (RTP) packet including the first image data with in the determined image format;

when the event related to camera switching is detected while transmitting the first RTP packet to the counterpart device, receive, from the external device, receive, from the external device, a second RTP packet including the second image data in the determined image format;

changing header information of the second RTP packet using header information of the first RTP packet; and transmitting, to the counterpart device, the changed second RTP packet.

* * * * *